United States Patent
Rashid

(10) Patent No.: US 8,442,883 B2
(45) Date of Patent: May 14, 2013

(54) RELATIONSHIP MANAGEMENT IN AN AUCTION ENVIRONMENT

(75) Inventor: Taimur A. Rashid, San Mateo, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1055 days.

(21) Appl. No.: 11/171,997

(22) Filed: Jun. 30, 2005

(65) Prior Publication Data

US 2007/0203820 A1 Aug. 30, 2007

Related U.S. Application Data

(60) Provisional application No. 60/584,407, filed on Jun. 30, 2004.

(51) Int. Cl.
*G06Q 40/00* (2012.01)

(52) U.S. Cl.
USPC ............. 705/35; 705/14.7; 705/37; 705/36 R; 705/26.3; 705/40; 705/80

(58) Field of Classification Search ................ 705/1–45, 705/14.7, 36 R, 80
See application file for complete search history.

(56) References Cited

U.S. PATENT DOCUMENTS

| | | | | |
|---|---|---|---|---|
| 5,835,896 A | * | 11/1998 | Fisher et al. | 705/37 |
| 6,366,891 B1 | | 4/2002 | Feinberg | 705/37 |
| 7,047,210 B1 | * | 5/2006 | Srinivasan | 705/26.3 |
| 7,305,469 B2 | * | 12/2007 | Leahy et al. | 709/225 |
| 7,941,348 B2 | * | 5/2011 | Veres et al. | 705/26.3 |
| 2001/0056394 A1 | * | 12/2001 | Hamada | 705/37 |
| 2002/0013760 A1 | * | 1/2002 | Arora et al. | 705/37 |
| 2002/0116316 A1 | * | 8/2002 | Griffiths | 705/37 |
| 2002/0120546 A1 | * | 8/2002 | Zajac | 705/37 |
| 2002/0165817 A1 | * | 11/2002 | Rackson et al. | 705/37 |
| 2003/0093326 A1 | * | 5/2003 | Poon et al. | 705/26 |
| 2004/0015409 A1 | * | 1/2004 | Chittenden et al. | 705/26 |
| 2004/0117293 A1 | * | 6/2004 | Lammle et al. | 705/37 |
| 2005/0125331 A1 | * | 6/2005 | Dinwoodie | 705/37 |
| 2005/0234801 A1 | * | 10/2005 | Zhang et al. | 705/37 |
| 2005/0234804 A1 | * | 10/2005 | Fang et al. | 705/37 |
| 2005/0246240 A1 | * | 11/2005 | Padilla | 705/26 |
| 2006/0116924 A1 | * | 6/2006 | Angles et al. | 705/14 |

* cited by examiner

*Primary Examiner* — Tien Nguyen
(74) *Attorney, Agent, or Firm* — Campbell Stephenson LLP

(57) ABSTRACT

A system for providing relationship management in an auction environment can include a relationship management system and an auction system. The relationship management system and the auction system are communicatively coupled to one another. The relationship management system is configured to provide a relationship management function in conjunction with access to the auction system.

20 Claims, 13 Drawing Sheets

RELATIONSHIP MANAGEMENT IN AN AUCTION ENVIRONMENT

This application claims the benefit under 35 U.S.C. §119 (e) of U.S. Provisional Application No. 60/584,407, which was filed on Jun. 30, 2004. Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

The present invention relates to the relationship management, and, more particularly, to relationship management in an auction environment.

2. Description of the Related Art

With the increasing popularity of the Internet, computer-based systems have become an extremely popular method for buying and selling a variety of merchandise. For example, there are systems for making purchases over a communication system which may be used in conjunction with a computer-based auction system or on-line storefront. There are also interfaces for vendor/product oriented Internet websites that can be used in conjunction with computer-based auction systems or on-line storefronts.

For example, in the case of on-line auction systems, bidders obtain products at competitive prices with the additional excitement and requisite skill of the bidding/auction process. As is commonly known, the bidder who participates in the auction process and is capable of making quick decisions as to whether to participate, or to recognize the price has become too high, will typically be the most successful in purchasing items (goods and/or services) at the most attractive prices. The standard auction process, as is also commonly known, involves bidders bidding for a particular product. The product is then sold to the highest bidder.

One type of computer-based auction for the sale of products utilizes e-mail sent over the internet. In this case, bidders send e-mail to the auction site with details of their bid and identity. Details of the bid are posted on the auction site and are available to other participants. The auction process typically has a time period of several days or weeks, and the product is sold to the highest bidder. One of the advantages of this system is the lack of complexity in running of the auction process over the internet where e-mail is used to communicate with the auction computer. Computer-based auctions can also be conducted entirely over the Internet. For example, computer implemented methods can be used to implement computer-based electronic bidding, auctioning and sales systems. Such methods can also be used to conduct loan and other auctions over computer networks.

With a typical auction, the seller provides information about the item, a relatively low initial starting price, a time when bidding will be closed and optionally, a reserve price that is only disclosed to the auction software and not available to bidders. Bidding proceeds as bidders incrementally raise the bid price as the bidding progresses. At the close of bidding, the high bidder obtains the product for the amount bid. However, if at the time of putting the product up for auction, the seller had included a reserve price that was higher than the high bid, the seller has the option of not selling the product to the high bidder. At the time a first bidder submits the incrementally higher bid, the first bidder may also provide a maximum bid that is only disclosed to the auction software and not disclosed to other bidders or the seller. As other bids are received, the auction software automatically incrementally increases the first bidder's bid as necessary to remain the high bidder. This bid amount will not be increased above the first bidder's maximum bid. In this manner, the first bidder will not have to constantly monitor the bidding process. Typically, the auction software will then notify the bidder by e-mail or some other means when the bidder is no longer the high bidder. Computer-based auctions are popular because of the large number of buyers that can participate on an individual auction. Bidding often extends over a period of several days to allow time for a number of buyers to find the item. Typically, there is a flurry of activity in the last portion of the auction process.

Another form of computer-based auction is the reverse auction, in which the price of the product decreases in a set manner during the time period of the auction and each participant is provided with the current price, the quantity on hand and the time remaining in the auction. This type of auction, typically, takes place over a very short period of time, and a flurry of activity typically occurs in the last portion of the auction process. The auction terminates when there is no more product to be sold or the time period expires.

Computer-based auctions are popular because, as are auctions generally, if the reserve price is met, a seller can be relatively certain of finding a buyer for the product. In addition, if a seller finds a high level of interest in an item, multiple bidders can produce very good selling prices for the seller. Buyers, on the other hand can often obtain a product at a favorable price.

However, the potentially grand scale on which a seller can operate in a computer-based auction environment and/or on-line storefront can lead to daunting challenges in managing a potentially large number of items being offered for bid or sale, as well as the need to deal with a potentially large number of entities (bidders, buyers, associates and the like). Moreover, information regarding the quantitative aspects of such a business are also important to track, in order to determine the health of the seller's business and the buying experience of the business's patrons.

Certain dedicated systems have been developed that allow organizations to track, forecast and analyze such details, in an effort to address the needs of businesses in this regard. These enterprise-based solutions assume a highly experienced administrator is available to configure and manage the software, as well as the tracking, forecasting and other tasks, for the organization. For example, some enterprise-based solutions allow an administrator to define queries that specify how forecasts are to be generated. However, a high degree of sophistication is required to correctly define such queries—a knowledge of not only the software systems employed, but also of quantitative business methods, pertinent statistics and the like. In addition, these enterprise-based solutions typically display forecast information in a format that may not provide an effective overview of the forecast information. Also, these enterprise-based solutions require that an administrator manually initiate each process, which can present problems if the administrator is unavailable or fails to initiate a forecast at the appropriate time. Thus, while such functionality is available, such systems are inappropriate for use in an auction environment, for a variety of reasons. This includes the complexity of such systems and the fact that such systems are not constructed for use by individuals, small groups, small businesses and the like.

What is therefore needed is a relationship management system for use in an auction environment, on-line sales environment and similar environments. Such a relationship management system should provide functionality appropriate to an entity conducting business in such an environment in an intuitive and user-friendly manner. Preferably, such a relationship management system would provide an integrated user interface (UI) that would allow easy access to the functions provided thereby.

SUMMARY OF THE INVENTION

In one embodiment, a system for providing relationship management in an auction environment is disclosed. The system includes a relationship management system and an auction system. The relationship management system and the auction system are communicatively coupled to one another. The relationship management system is configured to provide a relationship management function in conjunction with access to the auction system.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawings.

The use of the same reference symbols in different drawings indicates similar or identical items.

DETAILED DESCRIPTION

Figure 1:
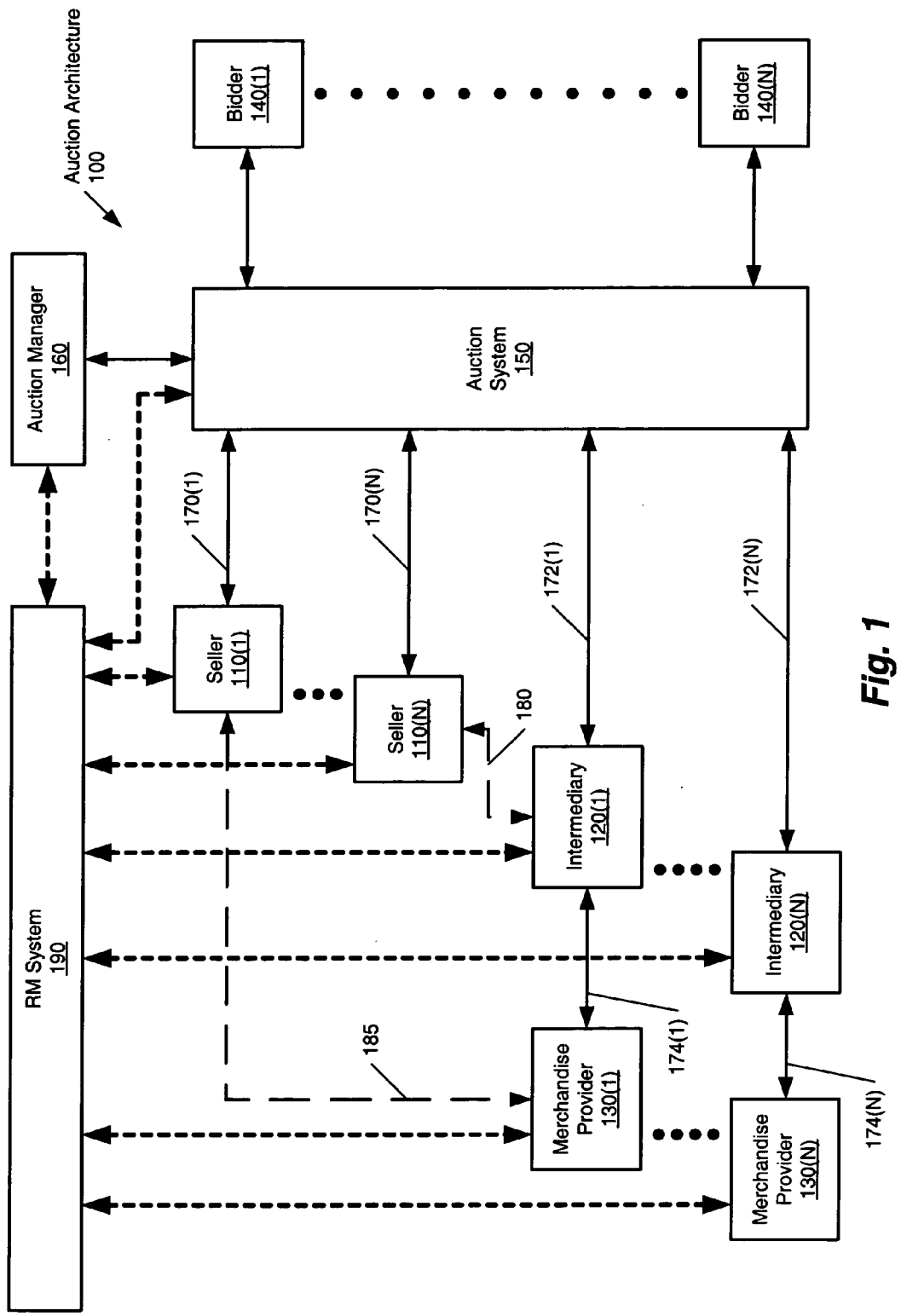
FIG. 1 is a block diagram of an auction architecture according to the present invention.

The following is intended to provide a detailed description of an example of the invention and should not be taken to be limiting of the invention itself. Rather, any number of variations may fall within the scope of the invention which is defined in the claims following the description.
Introduction The present invention provides customer relationship management (CRM) functionality in an on-line sales environment, such as an on-line auction system or on-line storefront system. More specifically, the present invention provides such CRM functionality to entities offering items for sale, as well as those managing such transactions.

For example, entities that can avail themselves of such CRM functionalities include entities in an auction environment such as sellers, merchandise providers and intermediaries. Sellers are those entities (businesses, individuals, groups or the like) who sell their own merchandise to bidders (those entities (other businesses, individuals, groups or the like) who bid on the merchandise) via the auction. Intermediaries are those entities (businesses, individuals, groups or the like) who sell merchandise from others (merchandise providers) to bidders via the auction. As will be apparent, merchandise providers are those entities (businesses, individuals, groups or the like) who provide merchandise to intermediaries, for sale by the intermediaries to bidders. Alternatively, such functionality can be used to assist in the efficient, effective management of on-line retail outlets, on-line service providers, and so on.

The ability to enhance customer experience and satisfaction while minimizing the overhead involved in doing so is particularly important to smaller entities, such as sole proprietorships, home-based businesses, and small offices that use auction and on-line storefront systems (also referred to herein as on-line retail web sites) to sell items (e.g., goods and/or services). Such entities need as much support as they are able to draw upon, as such entities are typically understaffed, due to cost considerations. Support via the automation of tasks is a particularly attractive avenue to obtain such support, due to the efficiency and relatively low cost involved.

For example, a comparative analysis of such entities suggests that the CRM needs are, among others, met by a variety of functionalities that a CRM system in an auction or on-line sales environment is able to provide. Such functionalities allow the seller to better provide its goods an service to the buyer, and include list management (product administration), management inventory of products with relevant product information, determination of real time inventory supply, automated notification of inventory levels and graphical representation thereof, analysis of inventory profitability using business analytics, the ability to compare historical trend analysis by categories or products, order management, and analytics, among other such functionalities.

Such functions can be provided in a centralized manner, through the use of one or more modules, which can be included on the client side or the server side. If provided on the server side, such a module can be included in the CRM system, in the on-line sales system or auction system, or in another server-side system. For example, the CRM system can include a generic auction/web storefront module that provides the requisite functionality, including features such auction functionality, the ability to manage inventory, the ability to track status of auctions, analytics for sales inventory (by category, user and so on), web storefront functionality, end-to-end management of the ordering and fulfillment process, integrated inventory management, and purchasing and vendor management, among other such features.

Advantageously, the present invention allows these functions and features to be provided within the auction or on-line sales environment, allowing the user to conduct their on-line business, while simultaneously having access to important information regarding their on-line business. Moreover, the present invention allows this information to be presented to the user in an integrated fashion (integrated with information from the auction/on-line storefront system in a single user interface), which consequently improves the user's productivity. As noted, this is of particular importance to smaller entities, such as sole proprietorships, home-based businesses, and small offices that use auction and on-line retail web sites to sell items (e.g., goods and/or services), which are typically under-staffed, due to cost considerations. Support via the automation of tasks is a particularly attractive avenue to obtain such support, due to the efficiency and relatively low cost involved.

The improvements in the operation of the user's business and productivity provided by the present invention translate into improved performance of the user and their business. The experience of the buyers availing themselves of the user's on-line business is thus enhanced, which ultimately translates into increased revenues for the business.

To support these various functions and features, a relationship management system according to the present invention employs connectors that support interfaces between the CRM system and relationship management system, and the auction/on-line storefront systems, enterprise resource management systems, payment systems and other business systems. In doing so, the relationship management system serves to interface the CRM system to the auction/on-line storefront system and user. For example, the CRM system and relationship management system can employ specific connectors for specific auction/on-line storefront providers. In certain cases, these providers may offer provider-specific application programming interfaces (APIs). In that case, the connectors can be designed and configured to leverage such provider-specific platforms. Thus, an advantage of the use of connectors is the ability to decouple the interface presented by the CRM and relationship management systems from the interface presented by the auction/on-line storefront systems.

Using such an approach, for example, the designers of the CRM and relationship management systems need only create a single interface (or at least, fewer such interfaces) in order to allow such systems to interface with a wide array of auction/on-line storefront systems. Such an approach provides several advantages. For example, such an approach provides ease of supporting new interfaces (either those of the CRM and relationship management systems, or those of the auction/on-line storefront systems), because only the connector need be altered to provide such support. In the case of a change to the CRM and relationship management systems, the changes to the interface are localized to the connector, and no changes to the auction/on-line storefront systems need be made. This is desirable, since there is often no access or ability to make such changes to the auction/on-line storefront systems, as such systems are typically under the control of another party. In the case of a change to the auction/on-line storefront systems' interface, such an approach removes the need to alter the CRM and relationship management systems (which can be under the control of different parties, located apart from one another, and so on), and localizes the changes to the affected connector. Adding support for additional CRM and relationship management systems and/or auction/on-line storefront systems is likewise simplified.

An Example Architecture for Revising Installation Software

FIG. 1 is a block diagram of an auction architecture 100 according to the present invention. Auction architecture 100 includes a number of sellers (depicted in FIG. 1 as sellers 110(1)-(N)), a number of intermediaries (depicted in FIG. 1 as intermediaries 120(1)-(N)) and a number of merchandise providers (depicted in FIG. 1 as merchandise providers 130 (1)-(N)). Sellers 110(1)-(N) and intermediaries 120(1)-(N) offer merchandise to a number of bidders (depicted in FIG. 1 as bidders 140(1)-(N)) via an auction system 150. Auction system 150 is managed by an entity depicted in FIG. 1 as an auction manager 160. As noted previously, merchandise providers 130(1)-(N) provide merchandise to intermediaries 120 (1)-(N), which, in turn, offer merchandise to bidders 140(1)-(N), on behalf of merchandise providers 130(1)-(N).

The typical relationships are shown (in solid lines) in FIG. 1. The relationship between ones of sellers 110(1)-(N) and bidders 140(1)-(N) are represented by relationships 170(1)-(N). In a similar fashion, the relationship between ones of intermediaries 120(1)-(N) and to bidders 140(1)-(N) are represented by relationships 172(1)-(N), with the relationship between ones of merchandise providers 130(1)-(N) and intermediaries 120(1)-(N) represented by relationships 174(1)-(N).

However, as will be appreciated, relationships other than those shown in solid lines in FIG. 1 can exist. For example, sellers can have relationships with intermediaries (as exemplified by a relationship 180 between sellers 110(N) and intermediary 130(1)). Another example is a relationship between a merchandise provider and a seller (as exemplified by a relationship 185 between seller 110(1) and merchandise provider 130(1)).

Typically, sellers 110(1)-(N) offer items for sale to bidders 140(1)-(N) via auction system 150. Similarly, intermediaries 120(1)-(N) offer items for sale to bidders 140(1)-(N) via auction system 150, as well, although intermediaries 120(1)-(N) typically do so on behalf of the items' owners, and so are not selling their own items. In other words, intermediaries 120(1)-(N) sell items, for example, "on consignment," taking some fee, percentage of the sale price or some other consideration for having made (or attempting to make) the sale on behalf of an item's owner. Conversely, merchandise providers 130(1)-(N) are owners of items that merchandise providers 130(1)-(N) offer for sale to other entities, such as other individuals and/or businesses, though such sales are not made via auction system 150. In auction architecture 100, merchandise providers 130(1)-(N) offer items to sellers 110(1)-(N) and intermediaries 120(1)-(N), among other entities, potentially, for subsequent sale to bidders 140(1)-(N), with sellers 110 (1)-(N) selling the items as their own, and intermediaries 120(1)-(N) selling the items on behalf of merchandise providers 130(1)-(N).

For example, merchandise providers 130(1)-(N) might offer items for sale to one or more of sellers 110(1)-(N), who buy the items from merchandise providers 130(1)-(N), and then resell the items via auction system 150. Sellers 110(1)-(N), alternatively, can secure items for sale by other means. Merchandise providers 130(1)-(N) can also offer items for sale through intermediaries 120(1)-(N), who then offer the items for sale to bidders 140(1)-(N) via auction system 150. It will be appreciated that, however, one or more of sellers 110(1)-(N), intermediaries 120(1)-(N) and/or merchandise providers 130(1)-(N) can each take on more than one role. For example, an entity can act as both a seller and an intermediary. Other combinations are also contemplated by the present invention, as will be appreciated. This ability to recognize, track and manage such a wide variety of relationships is an advantage is provided by a relationship management (RM) system 190 according to the present invention.

RM system 190 provides a number of relationship management functions to sellers 110(1)-(N), intermediaries 120(1)-(N) and merchandise providers 130(1)-(N), as well as to auction manager 160. RM system 190 provides relationship management functions such as analytics, contact management, customer service functions, sales account management functions and other such functions. The sales account management functions can include functions such as account management, sales cycle tracking, sales opportunity management, forecasting and other such sales account management functions. Moreover, the specific set of functions presented to a given entity can be tailored to that entity's role (e.g., a seller and a merchandise provider could be expected to have different needs in this regard, based on the entities with which each deals).

It will be noted that the variable identifiers (e.g., "N") are used in several instances in the figures to more simply designate the final element of a series of related or similar elements. The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" (or some other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components. It is to be understood that such depicted architectures are merely example, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

FIGS. 2A, 2B, 3, 4A, 4B and 4C are diagrams illustrating a user interface according to the present invention. These figures depict the relationship management functions that can be provided to an entity (e.g., a seller, an intermediary, a merchandise provider or the like) using a UI of the present invention. It will be noted that, although typically referred to as an entity herein, the party using one or more of the user interfaces described herein is also referred to as a user (from the fact that the entity referred to as such is using the system).

Functions provided by such a UI include sales lead management, calendaring of events, sales campaign management, sales account management, contact management, sales opportunity management and report generation. These functions are presented in an intuitive and easy-to-use manner, including list-based presentations and graphical presentations. This makes such functions sufficiently simple to be used by an entity such as an individual, small business personnel, small workgroup and the like. This results, in part, from the integration of a customer relationship manager (via an RM UI, which provides access to the relationship management functionality), and an auction or on-line sales system (e.g., via integration with the auction system's UI).

Figure 2A:
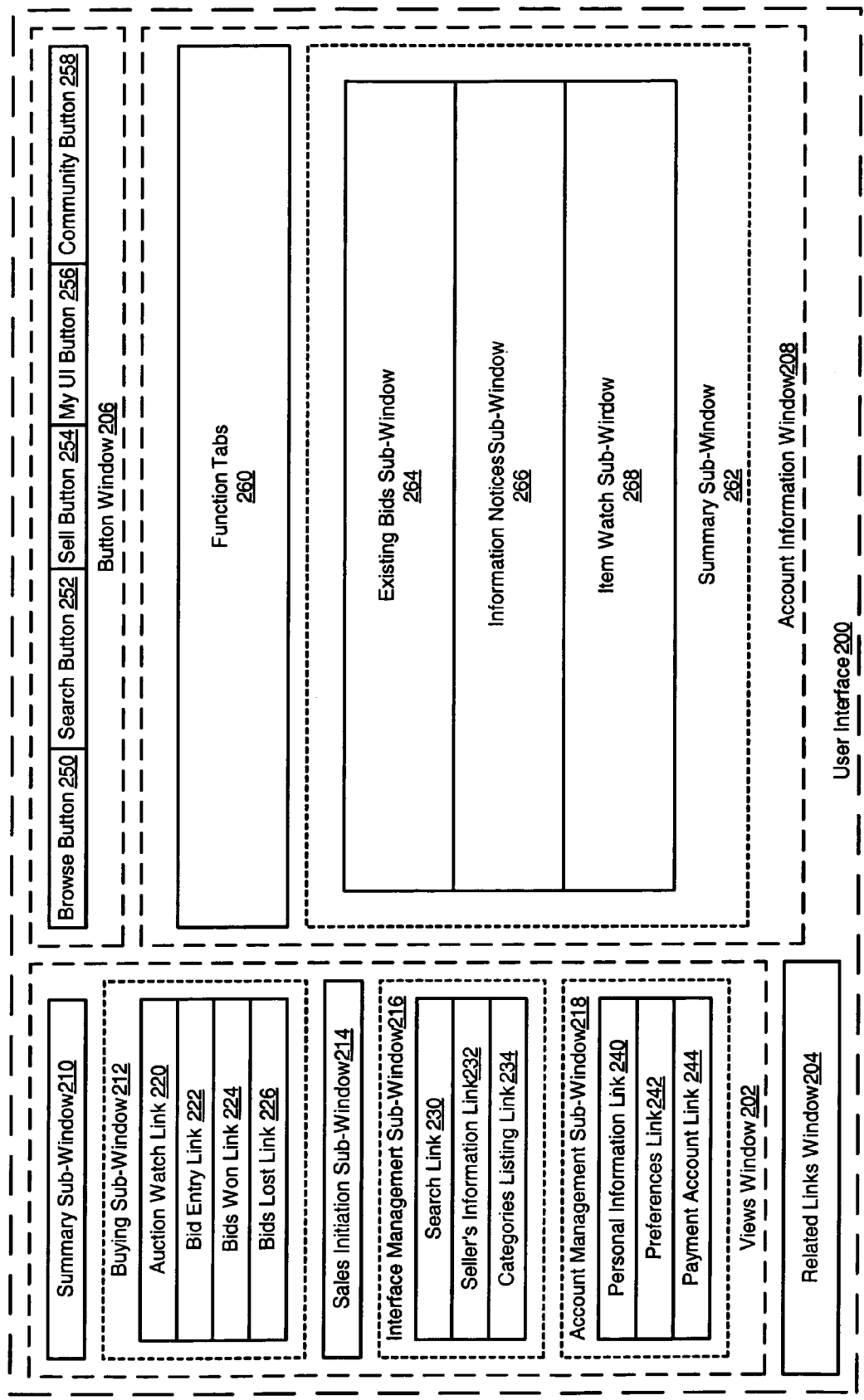
FIG. 2A is a block diagram of an example of the general layout of a user interface according to embodiments of the present invention.

FIG. 2A illustrates an example of a general layout of such a UI, which provides various functionalities according to embodiments of the present invention. The basic information needed by, for example, an entity in an auction environment (e.g., a seller) is provided in an intuitive, integrated and easy-to-use format. FIG. 2A depicts a user interface 200 that includes, among other potential elements, a views window 202, a related links window 204, a button window 206, and an account information window 208. Each of these windows provides the user with access to one or more features of the auction system and/or relationship management system. For example, related links window 204 provides access to a set of links to pages providing information and control of functions related to the auction system, items being auctioned and so on. As such, these related links can be made context-sensitive, and thus change dynamically with the information displayed in user interface 200.

As can be seen, however, certain of these windows include one or more sub-windows. For example, views window 202 includes a number of sub-windows, including a summary sub-window 210, a buying sub-window 212, a sales initiation sub-window 214, an interface management sub-window 216, and an account management sub-window 218. Summary sub-window 210 can provide, for example, a link that causes the presentation of an account summary such as that depicted subsequently in FIG. 4A, when selected. Similarly, the selection of sales initiation sub-window 214 results in the display of one or more pages that allow an entity to enter information regarding one or more items that are to be auctioned. An example of such a process is given in connection with FIGS. 7 and 8, subsequently.

In turn, however, certain of these sub-windows can include one or more links that allow a user access to various functionality of the auction environment. For example, buying sub-window 212, interface management sub-window 216 and account management sub-window 218 all are shown as including a variety of such links. Buying sub-window 212 is shown as including an auction watch link 220, a bid entry link 222, a bids won link 224 and a bids lost link 226. Auction watch link 220, when selected, allows a user to identify one or more items (i.e., good and/or services) that are being auctioned via the auction system, and by doing so, track the progress of each of the auctions in question. Bid entry link 222, when selected by the user, allows the user to enter a bid on one or more specific items. Bids won link 224, when selected, allows the user to list the items for which the user's bid(s) is (were) the winning bid(s). Similarly, bids lost link 226, when selected by the user, allows the user to view a list of bids that were not winning bids for the items in question.

In a fashion similar to that of buying sub-window 212, interface management sub-window 216 is depicted as including a search link 230, a seller's information link 232, and a categories listing link 234. Search link 230, when selected, allows a user to locate information regarding items, bids, users and other relevant information by querying one or more of the databases maintained by the auction system. Seller's information link 232 allows the entity to enter and maintain information regarding the entity, that is to be presented to other parties accessing the auction system (e.g., the entity's business address, billing address, business telephone/facsimile numbers and so on). Categories listing link 234 allows the entity to retrieve information regarding one or more categories of items that can be auctioned using the auction system.

In a fashion similar to that of buying sub-window 212 and interface management sub-window 216, account management sub-window 218 includes a personal information link 240, a preferences link 242, and a payment account link 244. Personal information link 240 allows the entity to enter and maintain personal information for the entity with regard to the given account. Typically, while this may include information such as that made available via seller's information link 232, personal information link 240 provides access to information regarding the entity that is not typically available to other parties accessing the auction system, but may be needed by the entity itself, the party operating the auction system (e.g., to allow access to private avenues of communication and billing), and so on. For example, such private information might include one or more of the entity's home address, home telephone/facsimile numbers, credit card information, bank account information, other payment information, insurance information, emergency contact information and so on. Preferences link 242, when selected, allows a user to set preferences for user interface 200 to the user's liking. Payment account link 244, when selected, allows a user to enter and maintain information regarding the user's payment and payment receipt accounts within the payment system used for funds transfer in transactions made using the auction system.

Button window 206 includes one or more buttons that allow for easy and quick access to particular functions within the auction environment. As shown in FIG. 2A, button window 206 includes a browse button 250, a search button 252, a sell button 254, a "My UI" button 256, and a community button 258. Browse button 250 allows the user to access various mechanisms to review information regarding items offered for auction. Search button 252 allows a user to search for items offered for auction, based on one or more criteria. Sell button 254 is used to begin a process in which the user will offer one or more items for auction to bidders using the auction system. "My UI" button 256 allows a user to configure user interface 200 to meet the user's needs and desires. Community button 258 allows the user access to one or more on-line communities within the auction system.

In a similar fashion, account information window 208 includes a number of sub-windows, that allow for the organization of information that is to be presented to the user. Account information window 208 is depicted as including a set of function tabs (depicted in FIG. 2A as function tabs 260) and a summary sub-window 262. Function tabs 260 allow for the display of various informational and control pages, including, in the auction environment example depicted in FIG. 2A, a home page, a calendar page, a leads page, a sales campaigns page, an account information page, a contacts page, a sales opportunities page, a reports page and a dashboard page, among other such possibilities. Summary sub-window 262 provides a summary of information and activity for the given user account, as well as links to other features and functions of the auction architecture employed. To this end, summary sub-window 262 includes an existing bids sub-window 264, an information notices sub-window 266, and an item watch sub-window 268. Existing bids sub-window 264 displays information regarding bids that the user has placed for various goods and/or services offered for bid through the auction architecture, including reminders regarding both bids (e.g., offers to purchase) and items offered for auction (e.g., items presented for bidding). Information notices sub-window 266 presents information to the user regarding general announcements (e.g., from the operator of the auction system, other users or other such parties), as well as announcements directed at specific groups of users and messages directed to the user in question. Item watch sub-window 268 allows a user to easily and quickly view information regarding one or more items being offered for bid, including those items on which the user may have already bid.

Figure 2B:
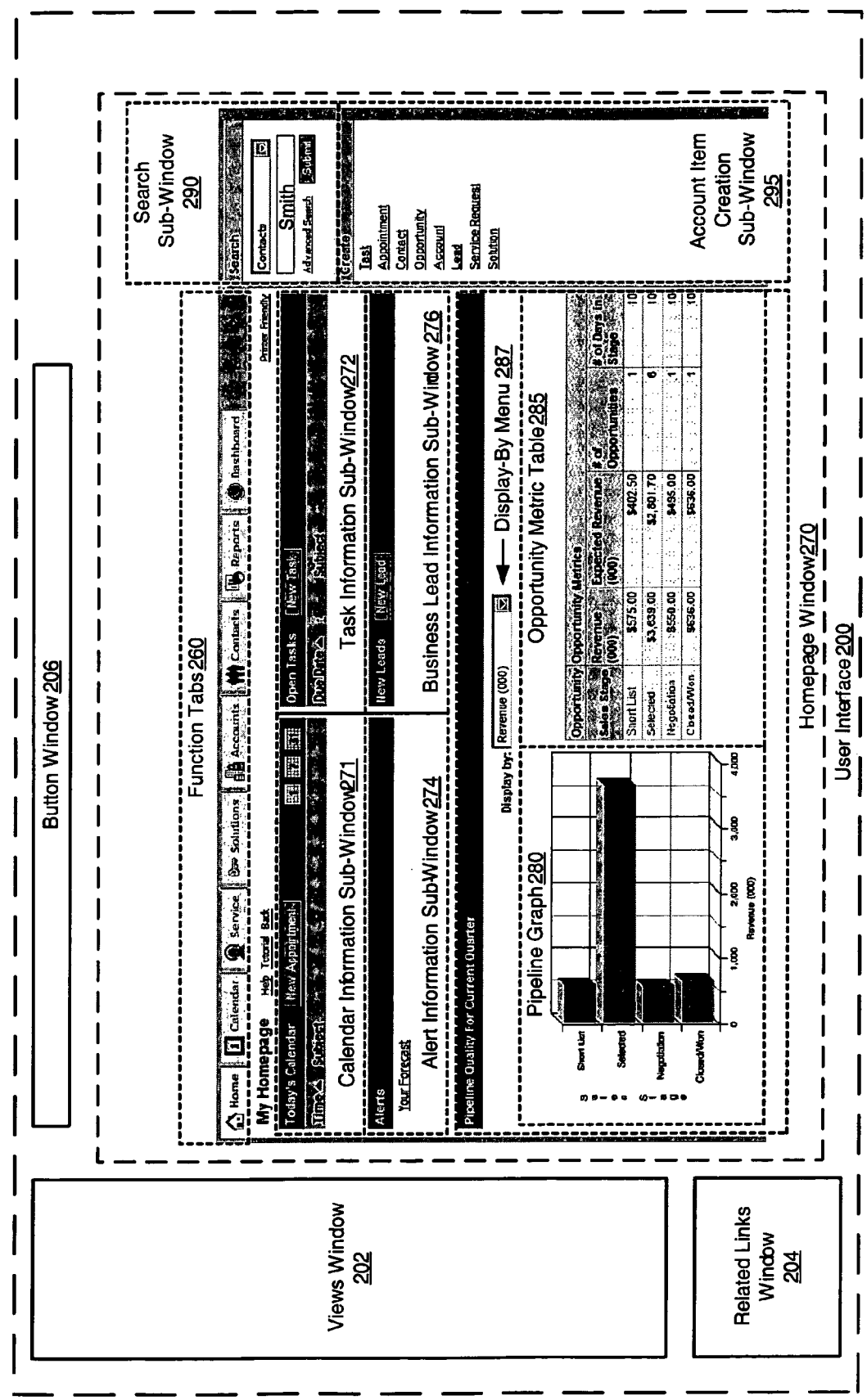
FIG. 2B is a block diagram of an example layout of a user interface according to embodiments of the present invention, in which a home page is presented.

FIG. 2B is an example of a RM UI home page that includes information regarding new sales leads, alerts, calendar information and sales metrics for the given entity. In addition to the functionality of views window 202, related links window 204 and button window 206 (as described in connection with FIG. 2A), the UI homepage of FIG. 2B provides information to the user in a homepage window 270 of user interface 200. The user causes homepage window 270 to be displayed by selecting the "Home" tab in function tabs 260, which also causes the "Home" tab to be highlighted (as depicted in FIG. 2B), indicating that the user is now viewing homepage window 270. As is depicted in the example shown in FIG. 2B, homepage window 270 can include a number of sub-windows, including a calendar information sub-window 271, a task information sub-window 272, an alert information sub-window 274, a business lead information sub-window 276 and a pipeline metric information sub-window 278.

As will be appreciated, calendar information sub-window 271 is employed to display calendar information such as appointments, events and the like, and can do so in increments of a single day, a single week, a single month or some other convenient format. Task information sub-window 272 allows for the entry, tracking and maintenance of "to do" items. Information displayed in calendar information sub-window 271 and task information sub-window 272 can be ordered based on their date, descriptive information or in some other fashion, typically by selecting the corresponding heading. Advantageously, information from the relationship management system (e.g., RM system 190) can be integrated with that from the auction system (e.g., auction system 150) in these sub-windows. For example, appointments, ending dates for items' auctions, delivery dates and so on can be integrated into one calendar, allowing the entity to review all date-based information for their on-line business at once.

Alert information sub-window 274 is used to prevent the user with notifications from the auction system and/or the relationship management system. These notifications may be informational in nature, or may be presented to the user in order for the user to take action thereon. Again, events related to the user's on-line business can be tracked, whether related to the user's business generally or auction-specific. Business lead information sub-window 276 presents the user with information regarding entities (e.g., persons, businesses and other such entities) that user may wish to contact (or may have already contacted) with regard to the user's on-line business.

Pipeline metric information sub-window 278 includes information displayed graphically (depicted in FIG. 2B as a pipeline graph 280) and in a tabular format (depicted in FIG. 2B as an opportunity metric table 285), thus allowing a user to view metrics regarding the on-line business' "sales pipeline" (or more simply, "pipeline) in both a graphical and numerical format. A display-by menu 287 is also provided as part of pipeline metric information sub-window 278. Display-by menu 287 allows the user to determine the information that will be displayed in one or more of the information displays in pipeline metric information sub-window 278. For example, as depicted in FIG. 2B, display-by menu 287 has been set to display revenue by selecting "Revenue (000)" from the selections presented in the menu of display-by menu 287 (in this case, a "drop-down" menu). Having selected "Revenue (000)", the information relating to revenues for the on-line business (in 000's) thus appears in pipeline graph 280 and opportunity metric table 285. As will be appreciated, pipeline metric information sub-window 278 serves as the interface to information maintained by and/or gathered by the underlying relationship management system. The relationship management system, based on input from the user (e.g., via display-by menu 287), queries its own databases and/or those of the auction system in order to provide information to the user in an easily understood and usable format.

As noted earlier, an architecture of the present invention is able to provide such information in such an intuitive and integrated fashion as a result of the communications between the relationship management system and the auction (or on-line store) system. For example, the relationship management system (either internally, or by calling upon a separate CRM system) retrieves the requisite information from information maintained by the relationship management and CRM systems, as well as the auction (or on-line store) system. The present invention then presents that information in a graphical and tabular format, thereby allowing the user to readily receive and understand the information, and so enjoy the enhanced productivity, improved business process and other advantages offered by the present invention.

Also depicted as part of homepage window 270 are a search sub-window 290 and an account item creation sub-window 295. Search sub-window 290 provides a menu button with a selection of parameters that allows a user to retrieve information regarding the user's account, based on the parameters selected. For example, as shown in FIG. 2B, a user might search their contacts for a person with the last name of Smith, in order to display the user's contacts having the last name of Smith. Account item creation sub-window 295 allows a user to create various objects having to do with the user's on-line auction account. Such objects include events, business transactions (including those that have already occurred, those that are to occur and those potential business transactions that may occur) and the like. As depicted in FIG. 2B, account item creation sub-window 295 allows for the creation of tasks, appointments, contacts, opportunities, accounts, leads, service requests and solutions.

As will be appreciated, such functionality can be provided by the relationship management system, for example, which allows such information to be stored thereby. Such information can then be made available with information maintained by the auction system, in a seamlessly integrated manner. Moreover, this information can easily be transferred between systems, using communication pathways provided by the present invention, such as those depicted in FIGS. 1, 5, 6A and 7. This interoperability is advantageous, as it allows for improved workflow, as demonstrated in the example provided in connection with FIGS. 7 and 8.

Figure 3:
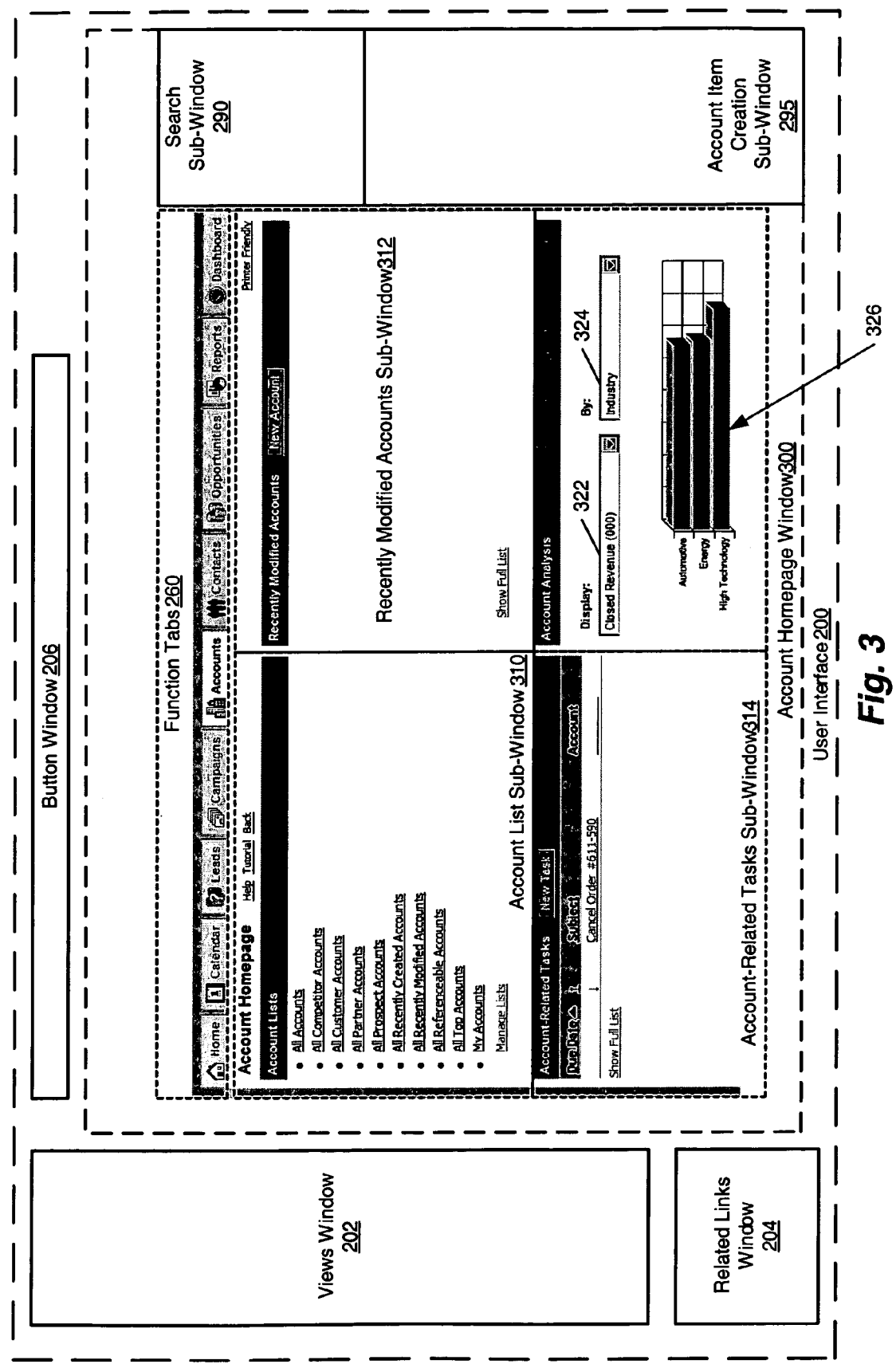
FIG. 3 is a block diagram of an example layout of a user interface according to embodiments of the present invention, in which an account home page is presented.

FIG. 3 is an example of a RM UI accounts page that includes information regarding the various accounts maintained by the entity, as well as account-related task information and analytics generated for a given account. In addition to the functionality of views window 202, related links window 204, button window 206 and function tabs 260 (as described in connection with FIGS. 2A and 2B), user interface 200 is shown as including an account homepage window 300. As before, a set of function tabs (depicted as function tabs 260) are provided. In this case, the user causes account homepage window 300 to be displayed by selecting the "Account" tab in function tabs 260, which also causes the "Account" tab to be highlighted (as depicted in FIG. 3), indicating that the user is now viewing account homepage window 300.

As to the contents of account homepage window 300, in addition to search sub-window 290 and account item creation sub-window 295 (as described in connection with FIG. 2B), other sub-windows displayed in account homepage window 300. These sub-windows can include, for example, an account lists sub-window 310, a recently modified accounts sub-window 312, and an account-related tasks sub-window 314, as well as an account analysis sub-window 320. Account list sub-window 310 allows a user to list accounts selected by one or more criteria. For example, a user can select the display of all accounts, all competitor accounts, all customer accounts, all partner accounts, all prospect accounts, all recently created accounts, all recently modified accounts, all referenceable accounts, all top accounts and my accounts, for example. As will also be noted, a link that allows for the management of these lists is also provided, allowing the user to select both the lists presented for selection and the criteria by which those lists are generated. Recently modified account sub-window 312 lists a set of links representing the accounts of the user kept for customers of the user that have been recently modified. As before, flexibility is provided in the presentation of this information, as exemplified by the "show full list" link at the bottom of recently modified account sub-window 312. Moreover, new accounts can be added and modified, and so appear on the listing within recently modified account sub-window 312. As before, this information can be maintained by the relationship management system and/or the auction system. This flexibility not only supports the integration of such information without regard to the source of the information, but allows the designers of such systems greater flexibility in partitioning responsibilities between the relationship management system and the auction system.

Account analysis sub-window 320 can include, for example, a display information menu 322, a display-by menu 324 and a graphical display 326. Display information menu 322 allows the user control over the type of information displayed in graphical display 326. For example, as depicted in FIG. 3, display information menu 322 has been set to "closed revenue" (in '000's), denoting that the information presented in graphical display 326 is the review generated by sales which have closed. Display-by menu 324 can then be employed to segregate this information by one or more criteria. In the example presented in FIG. 3, display-by menu 324 has been set to "industry", denoting that the information presented in graphical display 326 should be segregated by the industry to which the items sold belonged. As will be appreciated, the selections presented in display information menu 322 and display-by menu 324 can be configured to allow for the selection of any relevant and useful criteria, as may be desired by users of such systems.

Figure 4A:
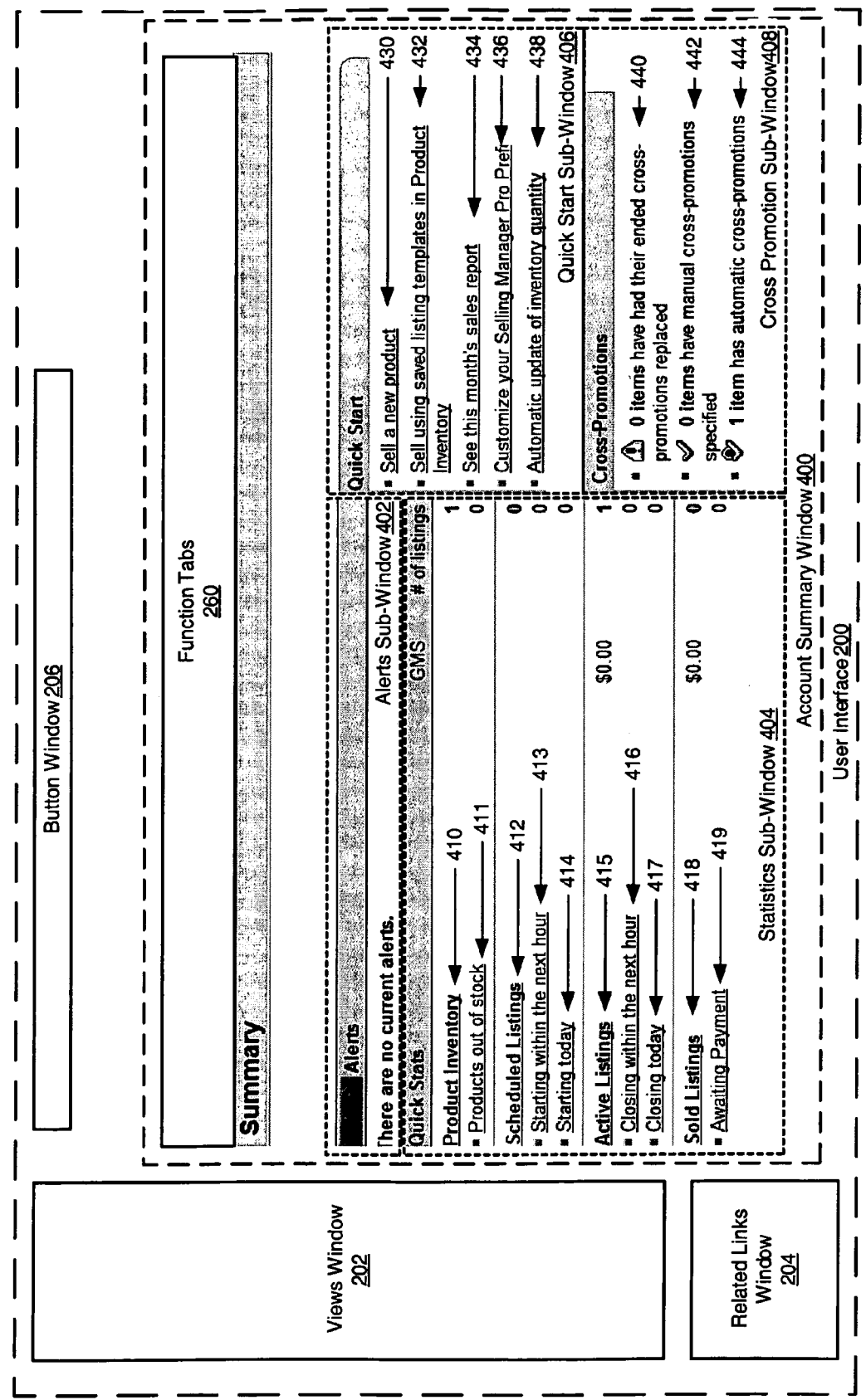
FIG. 4A is a block diagram of an example layout of a user interface according to embodiments of the present invention, in which an account summary is presented.

FIG. 4A is an example of a RM UI summary page that includes information regarding alerts, listings, product (merchandise) inventory and other such information. In addition to the functionality of views window 202, related links window 204, button window 206 and function tabs 260 (as described in connection with FIGS. 2A and 2B), FIG. 4A depicts user interface 200 as including an account summary window 400. The presentation of summary window 400 can be effected by selecting the appropriate link in summary sub-window 210 of FIG. 2A, for example.

Summary window 400, in turn, includes an alerts sub-window 402, a statistics sub-window 404, a quick start sub-window 406 and a cross-promotions sub-window 408. Alerts sub-window 402 provides the user information regarding items and actions requiring their attention. Statistics sub-window 404 provides the user with information regarding product that the user is or will be offering for sale (e.g., a product inventory link 410, which a user can select to display a list of products the user has in inventory; an out-of-stock link 411, which a user can select to display a list of products which are out-of-stock), a scheduled listings link 412, which can be selected to display information regarding the scheduled listing of products that will be offered for bidding (including product listings for products that will be open for bid starting within the next hour (a starting-within-the-next-hour listings link 413) and those starting on the given day (a starting today listings link 414)), an active listings link 415 which can be used to display a listing of products that are currently offered for bid (this includes the ability to list products, the bidding for which will close within the next hour, a closing-within-the-next-hour listings link 416); and a listing of products, the bidding for which will close on the given day (a closing-today listings link 417)), and a sold listings link 418 which can be selected to display a listing of products sold by the seller (this includes the ability to display a listing of products that are awaiting payment (an awaiting payment link 419)).

Quick start sub-window 406 includes links that allow a user to perform a variety of often-used functions quickly and easily. For example, a user may desire quick access to a variety of tasks, such as designating a new product for sale (by selecting a sell-new-product link 430), selling a product using saved listing templates already stored in product inventory (by selecting a sell-using-existing-template link 432), displaying the current month's sales in a current month's sales report (by selecting a current-month-sales-report link 434), customizing their interactions with user interface 200 using pre-set preferences (by selecting a customize preferences link 436), and automatically updating inventory quantity for one more products (by selecting an automatic-inventory-update link 438).

As noted earlier, information and links presented in statistics sub-window 404 and quick start sub-window 406 can include (or point to) information made available from the relationship management system and/or the auction system, and so integrate the functionality provided by these systems. For example, statistics sub-window 404 can include information regarding inventory (e.g., product inventory link 410 and out-of-stock link 411) from the relationship management system and items listed for auction (e.g., scheduled listings link 412, starting-within-the-next-hour listings link 413, starting today listings link 414, active listings link 415, closing-within-the-next-hour listings link 416, closing-today listings link 417, and sold listings link 418) from the auction system. Moreover, information and links that combine the functionality of the relationship management and auction systems are also provided (e.g., awaiting payment link 419).

In a similar fashion, quick start sub-window 406 is also capable of providing such integrated functionality. For example, quick start sub-window 406 can include information regarding inventory (e.g., sell-new-product link 430, sell-using-existing-template link 432 and automatic-inventory-update link 438) from the relationship management system and items listed for auction (e.g., sell-new-product link 430, sell-using-existing-template link 432, and customize preferences link 436) from the auction system. Moreover, information and links that combine the functionality of the relationship management and auction systems are also provided (e.g., sell-new-product link 430, sell-using-existing-template link 432, current-month-sales-report link 434, and automatic-inventory-update link 438). More particularly, sell-new-product link 430 can be used to transfer an item (and information therefor) from the relationship management system to the auction system. For example, a user can select sell-new-product link 430, which brings up a page that lists items in the user's inventory in the relationship management system, and those available for auction in the auction system. By simply dragging-and-dropping a given item's listing from the relationship management system's inventory listing to that of the auction system, the item can be made available for auction. Another example is sell-using-existing-template link 432, which, in certain embodiments, can be used to transfer information regarding the presentation of information regarding a given item from the relationship management system to the auction system. This allows for a common look-and-feel for listings in both systems. Again, such uniformity is of benefit to both buyer and seller, improving the seller's efficiency and enhancing the buyer's purchasing experience.

Cross-promotions sub-window 408, as the name implies, allows the user to control the cross-promotion of one product, when information regarding another product is being viewed by a potential buyer. Cross-promotion sub-window 408 thus includes information regarding items that are linked to one another for cross-promotion, and can also include links allowing a user to associate products with one another for purposes of cross-promotion. For example, a user may wish to view information regarding items having had their cross-promotions replaced after termination (by selecting a link 440), items having had cross-promotions specified manually (by selecting a link 442) or items having automatic cross-promotions set (by selecting a link 444).

Figure 4B:
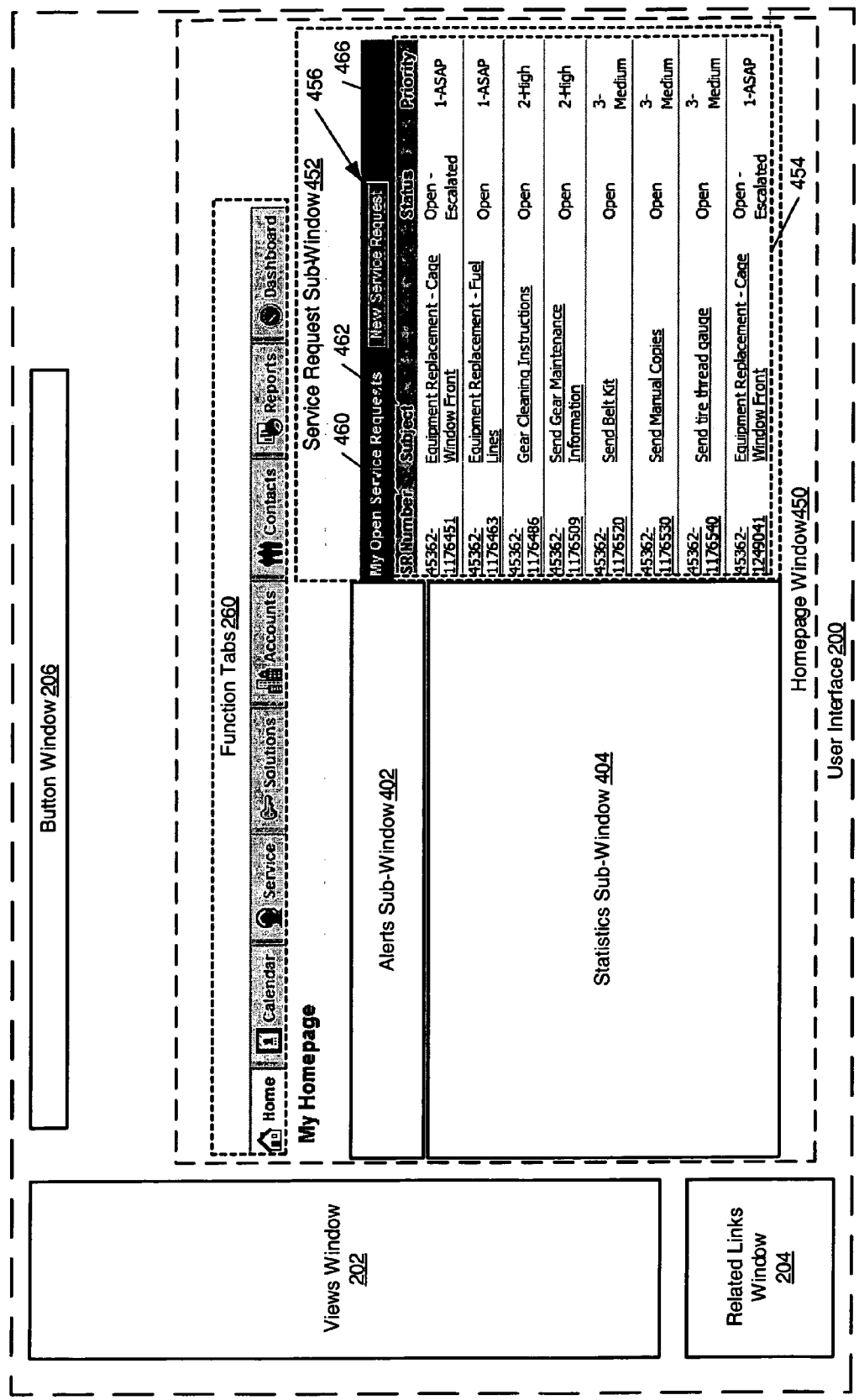
FIG. 4B is a block diagram of an example layout of a user interface according to embodiments of the present invention, in which a home page is presented.

FIG. 4B is also an example of a RM UI summary page that includes similar information, but that includes information regarding service requests (SRs). In addition to the functionality of views window 202, related links window 204, button window 206 and function tabs 260 (as described in connection with FIGS. 2A and 2B), user interface 200 of FIG. 4B is depicted as including a homepage window 450, among other possible windows. As before, a set of function tabs (depicted as function tabs 260) are provided. In this case, the user causes homepage window 450 to be displayed by selecting the "Home" tab in function tabs 260, which also causes the "Home" tab to be highlighted (as depicted in FIG. 4B), indicating that the user is now viewing homepage window 450.

As to the contents of homepage window 450, homepage window 450 includes alerts sub-window 402 and statistics sub-window 404, in the manner of account summary window 400. However, home page window 450 also includes a service request (SR) window 452. As in previous examples, homepage window 450 demonstrates the integration of information from the relationship management and auction systems, given that alerts sub-window 402 provides information from the auction system (although alerts from the relationship management system could also be displayed therein), and statistics sub-window 404 is an integrated display, in and of itself. The addition of service request window 452 provides yet another integrated display, by presenting information regarding service request information maintained by the relationship management system for items sold via the auction system.

Service request window 452 includes a listing of open service requests (depicted in FIG. 4B as an open service request listing 454) and also allows a user to create a new service request (SR) using a new service request button 456. Open service request listing 454 includes information regarding open service requests, which in this example are requests for service by purchasers which are to be serviced by the seller (e.g., equipment repair, informational inquiries, documentation requests and the like). The ability to quickly and easily organize and track such requests allows a seller to better serve the needs of those purchasing items and services from that seller. This, in turn, results in an improved purchase experience for buyers, thereby improving the probabilities of additional future sales to that buyer. As depicted in FIG. 4B, open service request listing 454 includes identifying information (e.g., a service request (SR) number 460), a short description of the request (e.g., a subject description 462), the status of the request (e.g., a status description 464; for example, one of open, closed, open-escalated or other such status information), and the service request's priority (e.g., a priority level 466).

In certain embodiments, service request number 460 is a unique number that identifies each service request, to allow for the ready look-up and identification of each service request, notwithstanding the type of service request in question. As will be appreciated, service request number 460 can be generating using a scheme that results in not only a unique identifier, but an identifier that carries with it information regarding various characteristics of the service request. To this end, subject description 462 can be used to further identify the service request using a plain language description. Status description 464 is used to convey the status of a given service request. status description 464 can take on values, for example, of "open", "closed", "open-escalated" or other appropriate status values, as mandated or made advisable by the possible situations that are to be expected in the given circumstance (e.g., "received for maintenance" would be inappropriate status for a service provided to a buyer). Status description 464 can take on values, for example, of "open", "closed", "open-escalated" or other appropriate status values, as mandated or made advisable by the possible situations that are to be expected in the given circumstance (e.g., "received for maintenance" would be inappropriate status for a service provided to a buyer). In a similar fashion, priority level 466 can take on any number of values, as is expedient for the ready identification and prioritization of service requests. In the example depicted in FIG. 4B, priority level 466 can take on values of 1 (ASAP), 2 (HIGH), 3 (MEDIUM) or 4 (LOW) (the last value not shown in FIG. 4B, although implied thereby). Again, the service requests displayed in service request window 452 can be ordered using any one of the criteria listed as headings therein, in order to provide the information in the most useable format for the given situation.

As will be appreciated, other schemes for prioritizing service requests can be used (e.g., more or fewer priority levels, a different rating scale and so on). Moreover, service requests listed in open service request listing 454 can be displayed in an order prioritized by any one of the fields just described, other fields that might be used to display information regarding the service requests therein, or some combination thereof. Primarily, open service request listing 454 acts as a quick reference to the service requests that are currently open. Though typically not a complete listing of all existing service requests, open service request listing 454 presents the user with a list of service requests that presently require attention since those are the most likely to need the most immediate attention. Again, such functionality improves the buyer's experience, which is of direct benefit to the entity's on-line business.

Figure 4C:
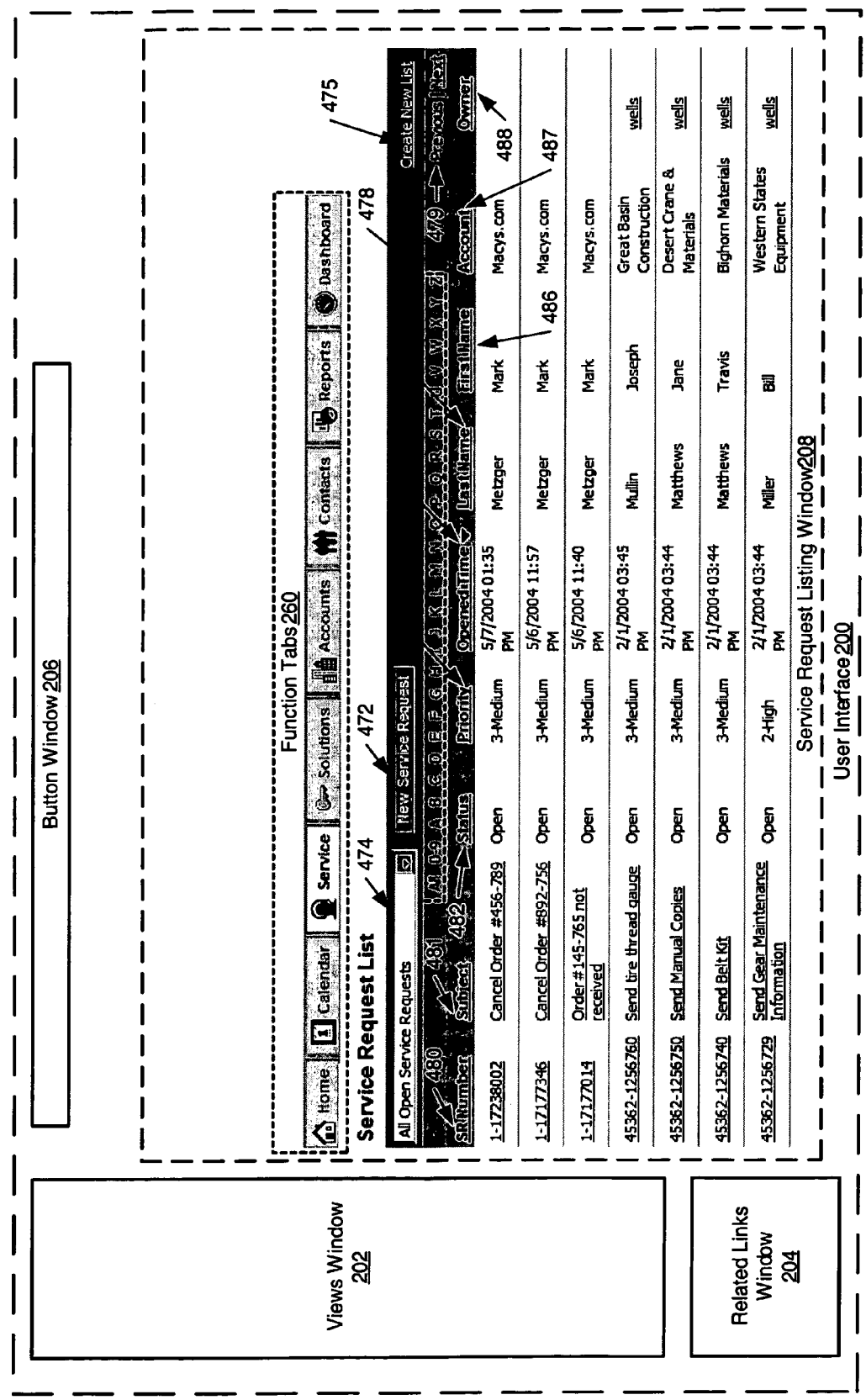
FIG. 4C is a block diagram of an example layout of a user interface according to embodiments of the present invention, in which a service request listing is presented.

FIG. 4C is an example of a RM UI service request list page that includes similar information regarding service requests, such as new orders, cancellations, requests relating to existing orders and the like. In addition to the functionality of views window 202, related links window 204, button window 206 and function tabs 260 (as described in connection with FIGS. 2A and 2B), user interface 200 is shown in FIG. 4C as including a service request listing window 470. As before, a set of function tabs (depicted as function tabs 260) are provided. In this case, the user causes service request listing window 470 to be displayed by selecting the "Service" tab in function tabs 260, which also causes the "Service" tab to be highlighted (as depicted in FIG. 4C), indicating that the user is now viewing service request listing window 470.

Service request listing window 470 provides information similar to that displayed in open service request listing 454, albeit with greater detail and a wider array of possible requests types. In a manner similar to that described in connection with new service request button 456, a new service request button 472 is provided to allow the user to add a new service request to the user's service request list displayed in service request listing window 470. Additionally, a service request listing filter menu 474 is provided, to allow the user to more effectively control the service requests listed in service request listing window 470. For example, a user may choose to list all open service requests as is provided in the example depicted in FIG. 4C, however, the user may desire to limit the service requests displayed based on one or more of the characteristics shown in the service request listing depicted in service request listing window 470 of FIG. 4C. For example, a user might choose to display only those service requests having an "open" status. Alternatively, the user may desire to show all status requests having a priority level of "1" (ASAP), or may choose some other characteristic and value thereof, in order to allow the display of only those service requests which are of interest.

A create new list button 475 is also provided to allow the user control over the creation of a new service request list. In a manner similar to that of open service request listing 454, the listing of service requests in service request listing window 470 can be ordered based on any one of the characteristics listed for each of the service requests. For example, a service request listing 476 is shown in FIG. 4C as being ordered based on the time at which each service request was opened. In one embodiment, the user can determine which characteristic is used to order the listing of service requests by selecting the link that is displayed as the heading of the relevant characteristic. As will be appreciated, service request listings may be longer than a single page. Thus, controls are provided to allow for the presentation and display of multi-page lists. To this end, an alphanumeric page selector 478 is provided, as well as a previous/next page selector 479. Service request listing 476, as depicted in the example in FIG. 4C, includes information regarding each status request, such as a status request number (e.g., a status request number 480), information regarding the subject of the status request (e.g., a subject description 481), information regarding the status of the service request (e.g., status information 482), and the priority level of the status request (e.g., a priority level 483). These fields provide information that is comparable to their counterparts in open service request listing 454 of FIG. 4B.

As depicted in FIGS. 4B and 4C, however, service request listing 476 provides additional information not displayed in open service request listing 454. This information can include, for example, the time at which the service request was opened (e.g., opened time 484), and information regarding the party requesting the service (e.g., a last name field 485 and a first name field 486), as well as other information (e.g., an account name 487 and an owner name 488). Opened time 484 provides information as to the time the service request was entered, as its name implies. The party making the service request is identified in the example depicted in FIG. 4C by their last and first names, as displayed in last name field 485 and first name field 486. Account name 487 allows for the display of information regarding, for example, the company of which the service requester is an employee.

Figure 4D:
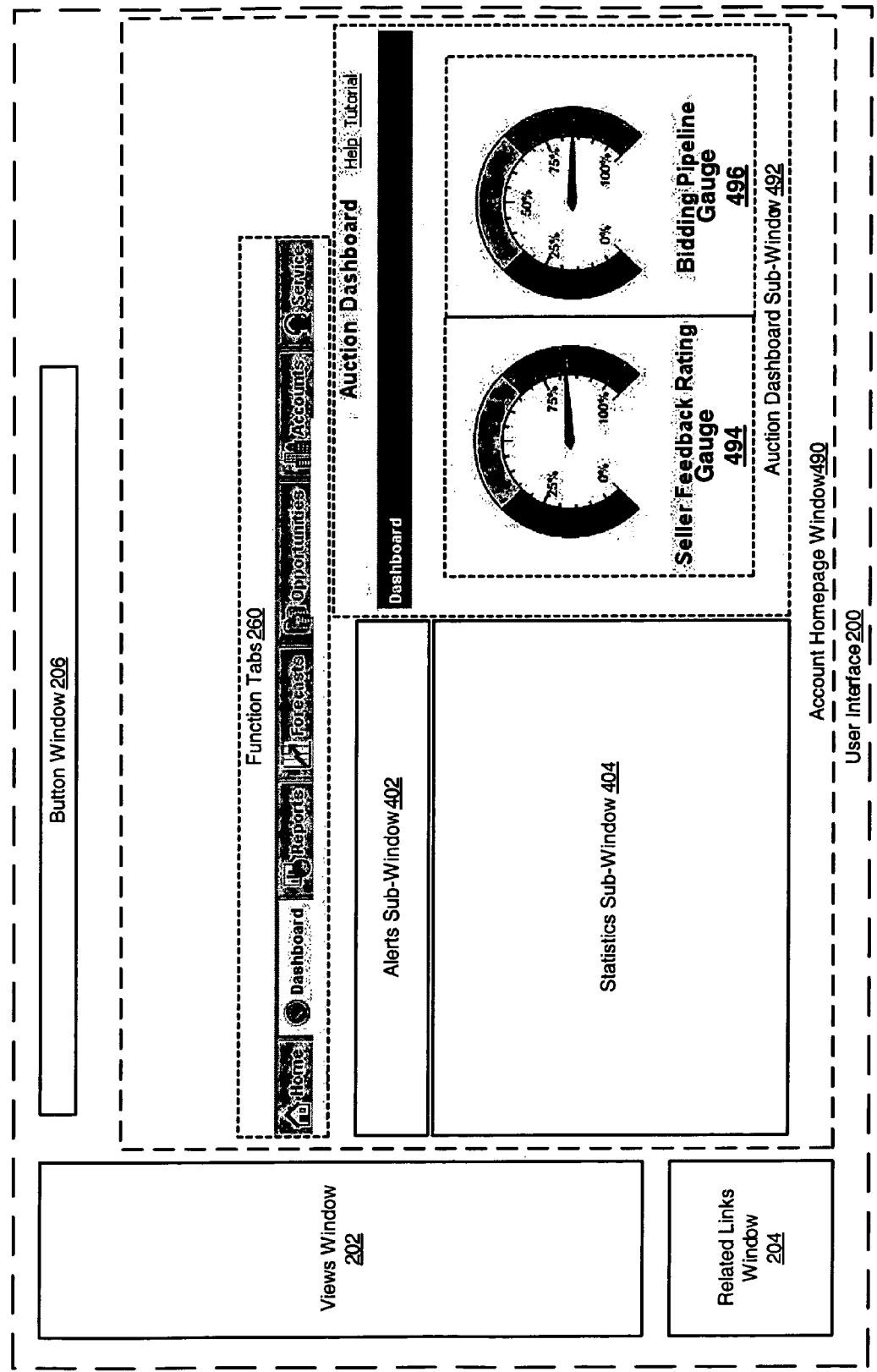
FIG. 4D is a block diagram of an example layout of a user interface according to embodiments of the present invention, in which an account home page having a "dashboard" is presented.

FIG. 4D is a block diagram illustrating user interface 200, in the presentation of an account home page window 490. Account homepage window 490 includes sever sub-windows, including alerts sub-window 402 and statistics sub-window 404. However, account homepage window 490 also includes an auction dashboard sub-window 492, as is denoted by the "Dashboard" tab highlighted in function tabs 260. Auction dashboard sub-window 492 provides for the graphical display of all manner of performance metrics for the user's auction activities. Auction dashboard sub-window 492, in the example depicted in FIG. 4D, includes a seller feedback rating gauge 494 and a bidding pipeline gauge 496. Seller feedback rating gauge 494 allows the user to quickly determine their average rating, as provided by bidders with whom the entity has dealt or is currently dealing. Similarly, bidding pipeline gauge 496 allows the user to quickly ascertain the efficiency of their auctioning process.

As will be appreciated, this information can include ratings of the entity's sales presentations (e.g., the web pages and information presented therein), quality of the follow-up service provided, pricing, quality of the goods or services provided, and the like. Similarly, allows the user to quickly ascertain the efficiency of their auctioning process. As will also be appreciated, the information presented in bidding pipeline gauge 496 can include ratings of the entity's sales effectiveness (items sold versus items offered for sale), days in inventory, days of inventory remaining, dollar volume. Moreover, each of these metrics, and/or other metrics, can be presented in a graphical format, either alone or in some combination with one another. As such, each metric or combination of metrics can be presented a graphical format, to allow the user quick, intuitive access to measures that are vital to the performance and success of the user's business.

Figure 5:
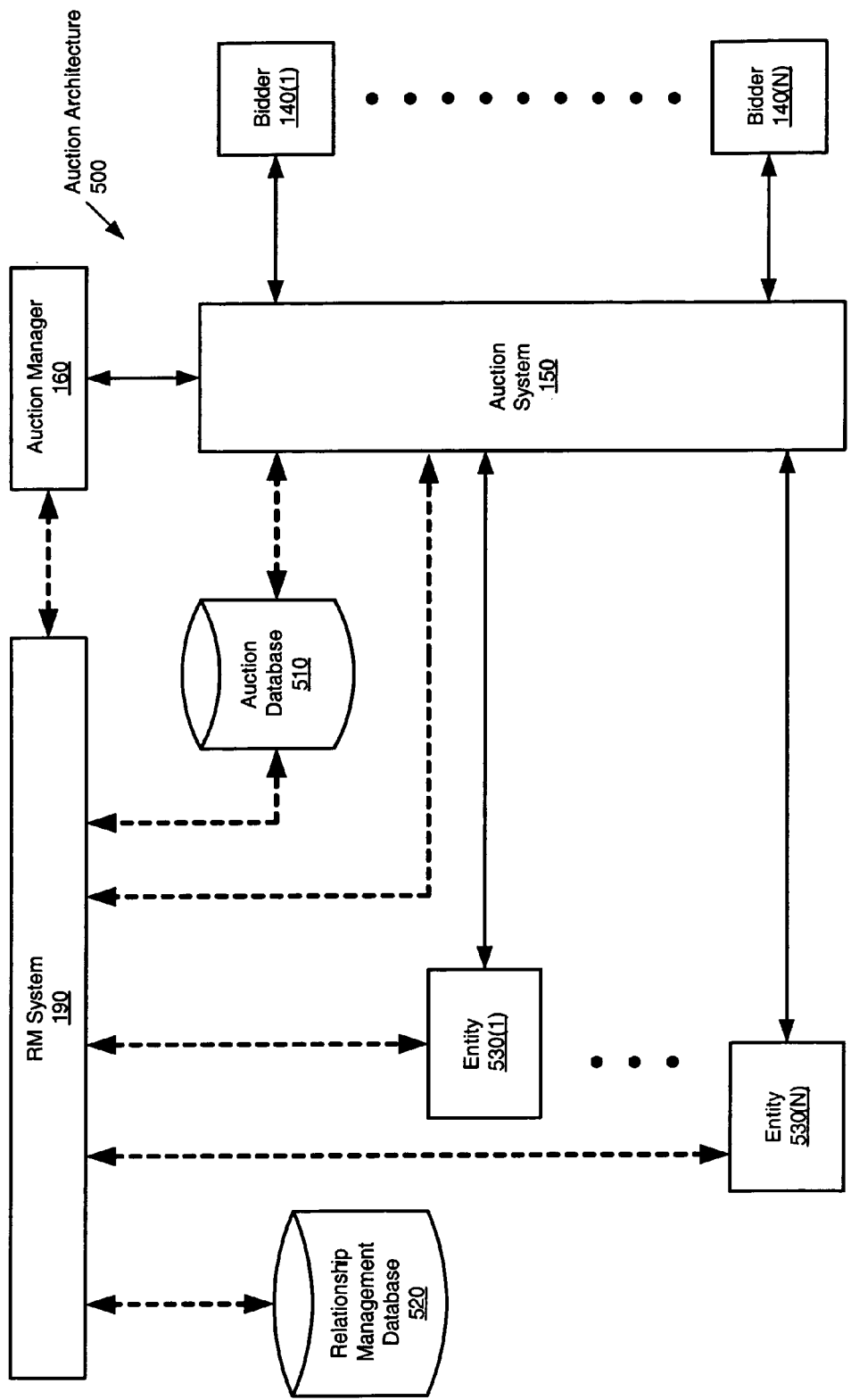
FIG. 5 is a block diagram of an auction architecture according to embodiments of the present invention.

FIG. 5 is a block diagram of an auction architecture 500 according to the present invention. Auction architecture 500 includes an auction database 510 and a relationship management database 520. Auction system 150 and RM system 190 are coupled to auction database 510, and are able to access auction database 510, in order to effect the auction process, and to track information regarding the auction process. RM system 190 is coupled to relationship management database 520, in which RM system 190 maintains information regarding the auction process. In FIG. 5 sellers 110(1)-(N), intermediaries 120(1)-(N) and merchandise providers 130(1)-(N) of FIG. 1 are depicted as entities 630(1)-(N). It will be appreciated that, in fact, auction database 510 and relationship management database 520 need not be separate databases, and can be integrated with one another, potentially improving performance by maintaining such information centrally.

Figure 6A:
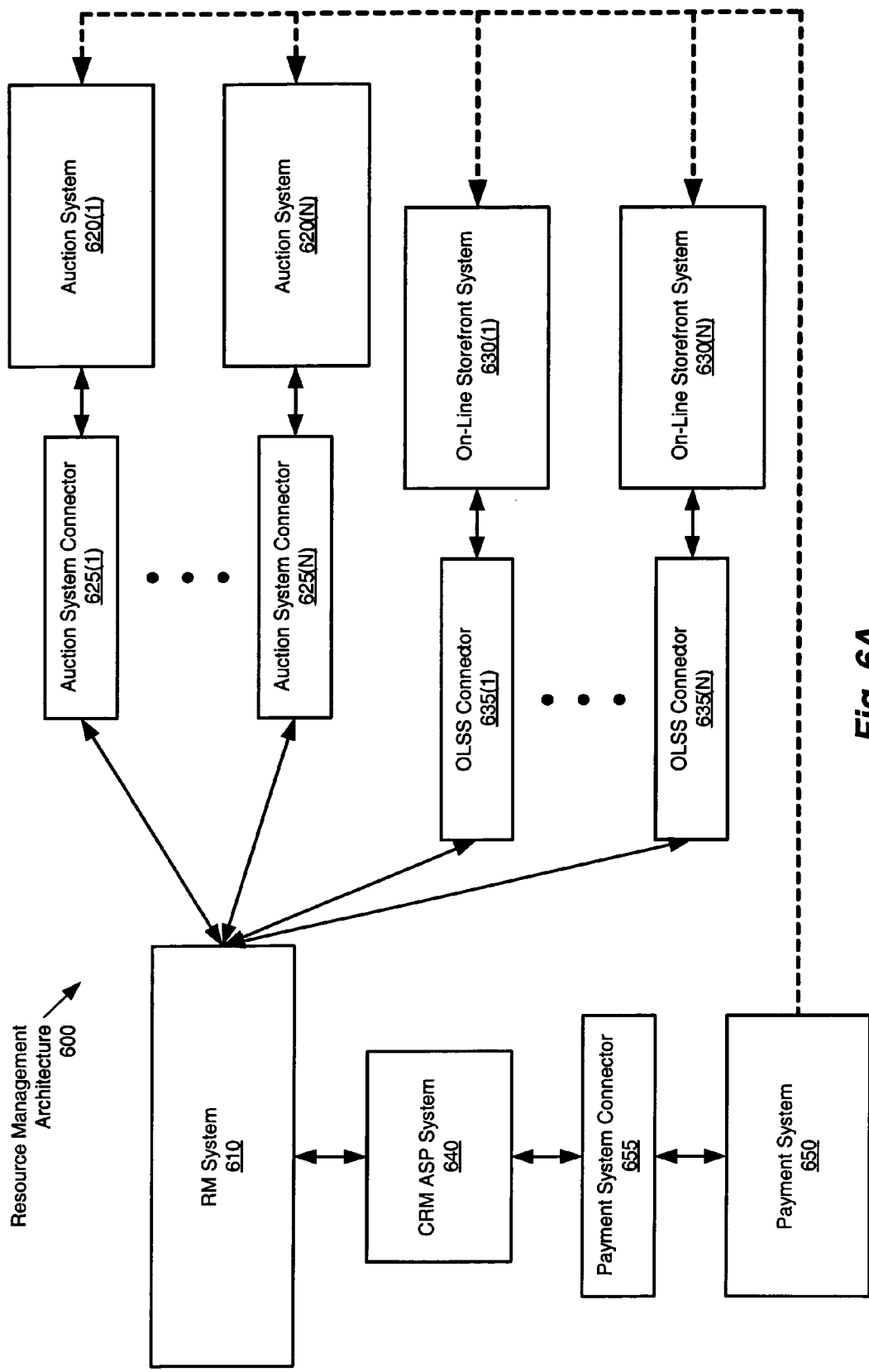
FIG. 6A is a block diagram illustrating an example of a relationship management architecture according to embodiments of the present invention.

FIG. 6A is a block diagram illustrating an example of a relationship management architecture 600 that is capable of supporting a number of auction systems such as auction system 150 of auction architecture 500 depicted in FIG. 5, as well as a number of on-line storefront systems. Resource management architecture 600 includes a relationship management system 610 that communicates with a number of auction systems (depicted in FIG. 6A as auction systems 620(1)-(N)) via a number of corresponding connectors (depicted in FIG. 6A as auction systems connectors 625(1)-(N)). In this context, auction systems 620(1)-(N) can be any online vendor providing an auction platform with an API to allow programmatic interaction with the given auction system. The API, discussed subsequently in connection with FIG. 7, allows common functionality across auction related tasks and processes.

Resource management system 610 also is capable of communicating with on-line storefront system (depicted in FIG. 6A as on-line storefront systems 630(1)-(N)) via a number of corresponding connectors (depicted in FIG. 6A as on-line storefront system (OLSS) connectors 635(1)-(N)). In this context, on-line storefront systems 630(1)-(N) can be any online vendor providing a web storefront platform with an API to allow programmatic interaction with the given on-line storefront system. Such an API, similar to the auction platform API discussed subsequently in connection with FIG. 7, allows common functionality across auction related tasks and processes.

As noted earlier, the use of connectors provides a number of advantages to the designers of the CRM and relationship management systems, as well as to the users of such systems. For example, the designers of such systems need only create a single interface (or at least, fewer such interfaces) in order to allow such systems to interface with a wide array of auction/on-line storefront systems. Such an approach provides several advantages. For example, such an approach provides ease of supporting new interfaces (either those of the CRM and relationship management systems, or those of the auction/on-line storefront systems), because only the connector need be altered to provide such support. In the case of a change to the CRM and relationship management systems, the changes to the interface are localized to the connector, and no changes to the auction/on-line storefront systems need be made. This is desirable, since there is often no access or ability to make such changes to the auction/on-line storefront systems, as such systems are typically under the control of another party. In the case of a change to the auction/on-line storefront systems' interface, such an approach removes the need to alter the CRM and relationship management systems (which can be under the control of different parties, located apart from one another, and so on), and localizes the changes to the affected connector. Adding support for additional CRM and relationship management systems and/or auction/on-line storefront systems is likewise simplified.

Resource management system 610 provides information to and receives information from auction systems 620(1)-(N) and on-line storefront systems 630(1)-(N) in order to support a customer relationship management (CRM) application service provider (ASP) system 640. CRM ASP system 640 provides the customer relationship management functionality to edit these such as entities 530(1)-(N) via relationship management system 610. CRM ASP system 640 also supports payment functionality, in order to allow purchasers to transfer finds to sellers when purchasing goods and services from sellers (e.g., winning bidders paying sellers in one of auction systems 620(1)-(N), or buyers paying for goods or services purchased from seller's storefronts in on-line storefront system 630(1)-(N).

Auction system connectors 625(1)-(N) and OLSS connectors 635(1)-(N), and auction systems 620(1)-(N) and on-line storefront systems 630(1)-(N) can communicate with one another using a web services architecture, for example. Such a web services architecture can employ, for example, an extensible markup language (e.g., XML) and an access protocol (e.g., simple object access protocol (SOAP)). An example of such a web services architecture is given in connection with FIG. 6B and its description, subsequently.

Auction system connectors 625(1)-(N) provide an integration mechanism between relationship management system 610 and auction systems 620(1)-(N) using web services (e.g., via a SOAP mechanism). Auction system connectors 625(1)-(N) map relationship management system functionality to functionality within auction systems 620(1)-(N) via an application programming interface (API) provided by both systems. Auction system connectors 625(1)-(N) facilitate the transfer of data between the systems, and ties directly to the "Auction Module" interface, providing a direct mapping between relationship management system 610 and auction systems 620(1)-(N).

OLSS connectors 635(1)-(N) provide an integration mechanism between relationship management system 610 and on-line storefront systems 630(1)-(N) using web services (e.g., via a SOAP mechanism). OLSS connectors 635(1)-(N) map functionality provided by relationship management system 610 to OLSS functionality via an application programming interface (API) provided by both systems. OLSS connectors 635(1)-(N) facilitate the transfer of data between the systems, and ties directly to the "OLSS Module" interface, providing a direct mapping between relationship management system 610 and OLSS connectors 635(1)-(N).

In one embodiment, CRM ASP system 640 communicates with a payment system 650 via a payment system connector 655 in order to effect the requisite finds transfer. In this context, payment system 650 can be any online vendor providing a payment platform with an API to allow programmatic interaction with the given payment system. The API, discussed subsequently in connection with FIG. 7, allows common functionality across payment related tasks and processes.

Payment system connector 655 provides an integration mechanism between relationship management system 610 and payment system 650 using web services (e.g., via a SOAP mechanism). While relationship management system 610 can have its own captive (e.g., built-in) payment system, relationship management system 610 can leverage an enterprise resource planning (ERP) system to handle payment. Alternatively, and as depicted herein, payment system connector 655 facilitates transactions between online payment systems, with online payment options, such as payment system 650. Payment system connector 655 ties directly to the "OLSS Module" interface of relationship management system 610, providing a direct mapping between relationship management system 610 and payment system 650

As will be appreciated, CRM ASP system 640 need not be any particular ASP-hosted CRM application. CRM ASP system 640 can be any ASP-hosted CRM application that is capable of providing the requisite functionality to resource management system 610, providing the CRM functionality needed to support the user's on-line business. Within this CRM application, an "Auction Module" and/or "OLSS Module" will be provided that serves as the user interface (front end system) for the auction, on-line storefront, and payment systems connector. In an auction context, the "Auction Module" provides "coupled functionality," deriving information from both the RM and auction/on-line storefront systems. Such coupled functionality can include, for example, the ability to submit listings from the relationship management system's product catalog to the auction system (as described earlier), view listings (both the relationship management system's product inventory and the auction system's listings), retrieve bidder information from the auction system to create an account within the relationship management system, and view sold/unsold listings, among other such functions.

As noted, in certain embodiments of the present invention, the connectors depicted in FIG. 6A (auction system connectors 625(1)-(N) in OLSS connectors 635(1)-(N)) employ web service technology. A web service can be, for example, a collection of protocols that allow for the exchange of data between applications over a network. These protocols can be proprietary or standards-based. In the latter case, the use of a standards-based approach typically simplifies the interfacing of various elements of the architecture, as well as their creation (e.g., coding (either manually or automatically), test, and so on). An example of such an architecture is given in FIG. 6B.

Figure 6B:
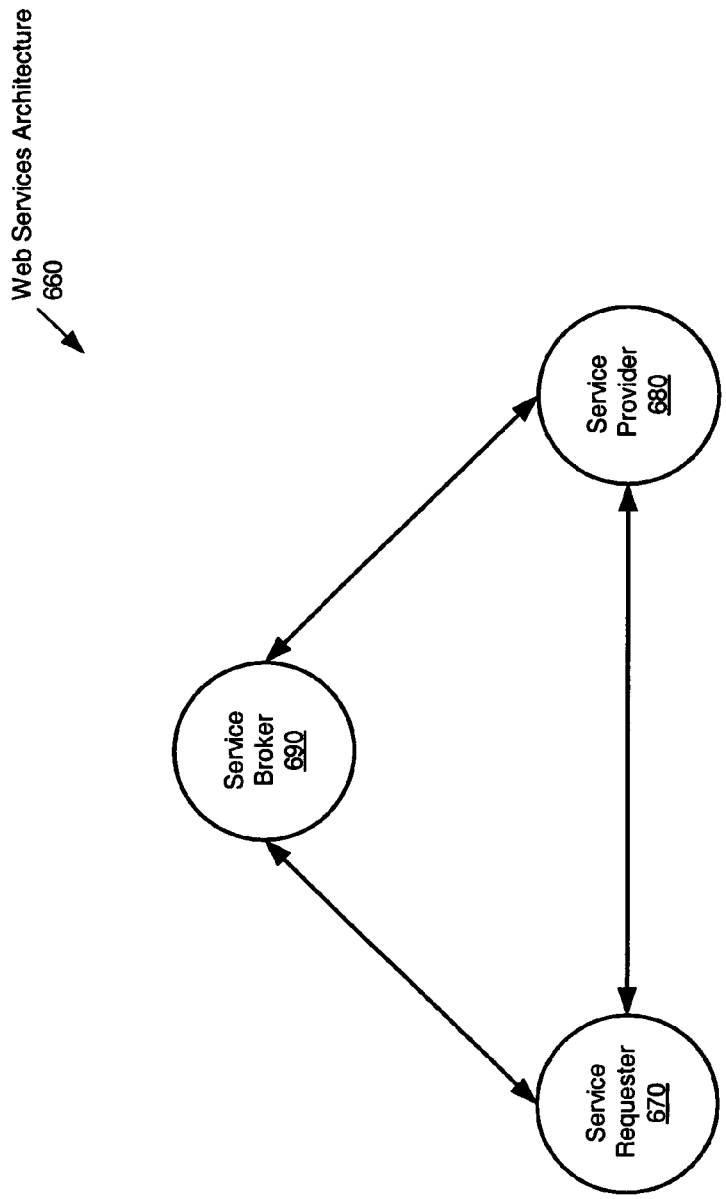
FIG. 6B is a block diagram illustrating an example of a relationship management architecture according to embodiments of the present invention.

FIG. 6B is a block diagram illustrating an example of a web services architecture 650. An architecture such as web services architecture 650 can be used to couple the various elements of a relationship management architecture of the present invention to one another. Acting as the "glue" between the different systems of such an architecture, a holistic marketplaces system is created for the users in such an architecture. This approach of "gluing together" cross-functional systems to achieve an overarching system which acts as a global enterprise system can be facilitated via techniques such as a web services approach, and the employment of a service-oriented architecture (SOA). This architecture is an effective way to leverage various systems whereby domain expertise can originate with multiple vendors, and so avoid the need for control over all systems in an end-to-end approach. Although such an end-to-end approach is certainly possible, such an approach is likely fraught with practical obstacles (e.g., a sole proprietorship is certainly not going to take on creating and administrating a public auction web site).

Using any "customer facing" application (whether proprietary, open source or custom built) as a central application, domain specific infrastructures can be leveraged from other systems. In essence, using web services allows for the convergence of distinctly operated, disparate, and yet fully functional, communities. The CRM community can seamlessly leverage auction functionality and also interact with the auction site's community. Conversely, the auction community can leverage analytical capability offered by CRM to provide value-added information for the auction site's sellers.

In this context, a web service is a collection of protocols (which are preferably, but not strictly, standards based) that are used for the exchange of data between applications. Software applications written in various programming languages and running on various platforms can use such web services to exchange data over computer networks (e.g., the Internet) in a manner similar to inter-process communication on a single computer. The use of standard protocols enhances interoperability, and so is preferable to proprietary solutions, although the latter can certainly be employed, either in part or totally.

As depicted in FIG. 6B, web services architecture 650 includes a service requester 670, a service provider 680 and a service broker 690. Web services architecture 650 employs the following elements to provide the requisite information transfer between service requester 670 and service provider 680. This includes a web services protocol stack, which, in turn, includes standards-based protocols used to implement a web service, and is typically considered as a protocol stack. An extensible markup language such as XML allows data to be exchanged that is formatted in accordance (e.g., with XML and tags therefor). This encoding can be performed using an object access protocol such as SOAP, or a remote procedure call in the extensible markup language (e.g., extensible markup language-remote procedure call (XML-RPC)). One advantage to using an extensible markup language such as XML is that such standard protocols allow data to be transported between applications using other common standard such as hypertext transfer protocol (HTTP), file transport protocol (FTP), simple mail transfer protocol (SMTP) and Extensible Messaging and Presence Protocol (XMPP).

Web services architecture 650 can also employ service broker 690, which serves as a repository of information regarding what services are available, from which systems, and other related information. Service requester 670 and service provider 680 can communicate with service broker 690 using, for example, a protocol such as web services description language (WSDL). WSDL is used to described the public interface of the web services available via service broker 690. WSDL is an XML-based service description that relates the manner in which service requester 670 and service provider 680 should communicate using the web service. Service broker 690 can employ, for example, the universal description, discovery, and integration (UDDI) protocol to publish the requisite web service information. UDDI enables applications to look up web services information in order to determine whether or not to use those web services.

As will be appreciated by those of skill in the art, while the web services architecture described herein (web services architecture 650) provides functionality that supports a relationship management architecture of the present invention, other architectures and protocols can be used to provide such support. Moreover, such architectures and protocols can be standards-based, proprietary, or a mixture thereof. These alternatives can be used with equal success, and the claims appended hereto envision such alternatives as being within their scope.

Figure 7:
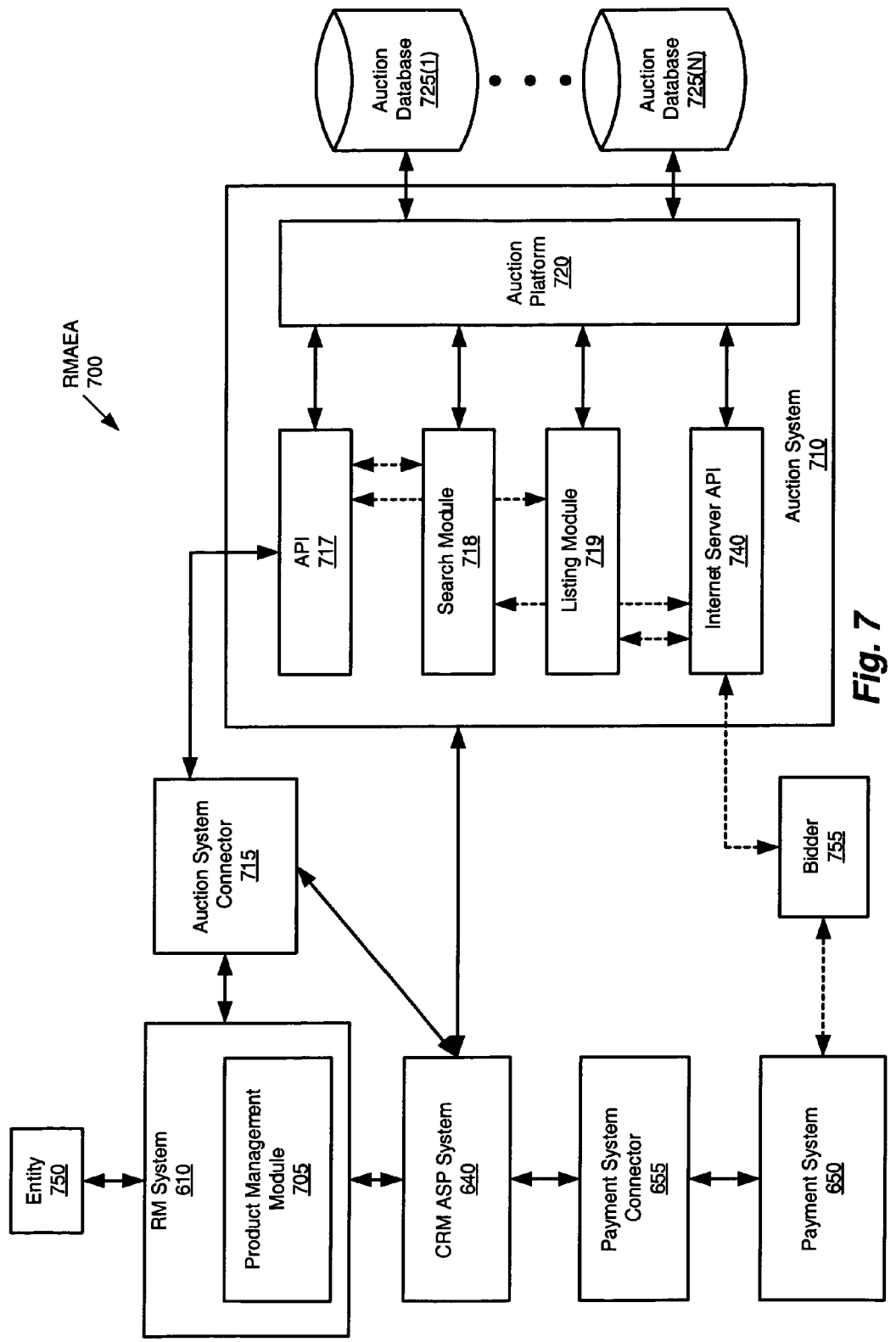
FIG. 7 is a block diagram illustrating an example of a relationship management architecture according to embodiments of the present invention, in an auction environment.

FIG. 7 is a block diagram illustrating an example of a relationship management architecture (e.g., such as that depicted in FIG. 6A) in an auction environment. Resource management auction environment architecture 700 (RMAEA 700) is an example of portions of relationship management architecture 600, in greater detail. Thus, RMAEA 700 includes relationship management (RM) system 610, which manages and presents information provided by CRM ASP system 640. CRM ASP system 640, in turn, communicates information regarding payments to, and receives information regarding payments from payment system 650 via payment system connector 655, all as depicted in FIG. 6A. It will be appreciated that the communications between CRM ASP system 640, payment system connector 655 and payment system 650 can be supported in the manner discussed in connection with FIGS. 6A and 6B, for example. In FIG. 7, relationship management system 610 is depicted as including a product management module 705. Product management module 705 provides seamless flow of information and control from CRM ASP system 640 to the auction system in question (e.g., an auction system 710). For example, this functionality allows a user to manage their items listed for auction, while staying logged into CRM ASP system 640.

In the example depicted in FIG. 7, relationship management system 610 communicates with auction system 710 via an auction system connector 715. Access to auction system 710 by auction system connector 715 is supported by an application programming interface (API) 717 that can employ, for example, a web services architecture such as that depicted in FIG. 6B. As such, auction system connector 715 and API 717 allow relationship management system 610 and CRM ASP system 640 to access auction system 710 quickly and efficiently. Functions provided thereby include the ability to submit listings to auction system 710, view listings on auction system 710, retrieve bidder information from auction system 710, view sold/unsold item listings, and the like. To support such functionality, auction system 710 provides a number of modules, among them a search module 718 and a listing module 719. Search module 718 allows an entity auctioning goods or services via auction system 710 to search personal and business information, payment information, service information, and so on. For example, search module 718 can be called on to identify outstanding service requests such as those displayed in user interface 200 of FIG. 4C as service request listing 476, or open service request listing 454 in FIG. 4B. Similarly, listing module 719 allows the user to display information regarding the items (e.g., those currently being offered for auction) in a usable, intuitive format. While the information that is accessible to the user is seller-centric, from this perspective, these modules and their functionality are available to bidders, as well, as is discussed subsequently.

Auction system 710 is a more specific example of one or more of auction systems 620(1)-(N), depicted in FIG. 6A. Auction system 710 includes an auction platform 720, which supports the functionalities that allow an entity to auction goods and services on-line. Information regarding the auctioning of the goods and services being offered for auction, as well as other information (e.g., personal and business information of sellers and bidders, payment information, service request information, and so on), is maintained in auction databases 725(1)-(N).

As noted, relationship management system 610 is able to access this information, as well as the functionalities offered by auction system 710, via auction system connector 715. Auction system 710 supports such communications by providing an application programming interface 717 that can be used by auction system connector 715 (and so relationship management system 610 and CRM ASP system 640) to communicate with auction platform 720, and so to gain access to information stored in auction databases 725(1)-(N). It will be appreciated that the communications between these modules can also be supported in the manner discussed in connection with FIGS. 6A and 6B, for example.

Auction system 710 also provides various useful functionalities that allow a user to access the information stored in one or more of auction databases 725(1)-(N). Such operations are supported, for example, by search module 718 and listing module 719, as well as an internet server application programming interface (API) 740. Search module 718 allows a user, via auction platform 720, to search the information stored in auction databases 725(1)-(N) for desired information. For example, such information might include contact information for sellers, the buyer's personal information (e.g., address, telephone number, and so on), and the like. Information regarding items being auction can also be gathered, using listing module 719, which can be used to present this information in the manner depicted in the preceding figures showing such screen shots. These functionalities are supported by internet server API 740, which allows web access to these modules, as well as other modules supporting the auction process.

Figure 8:
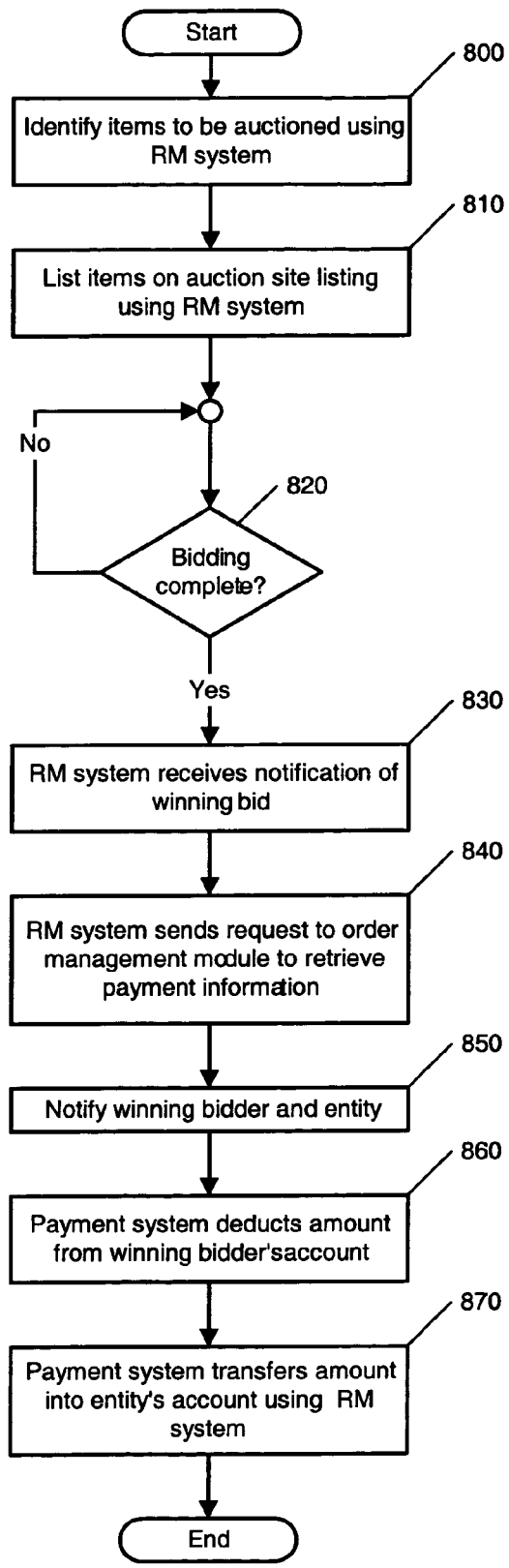
FIG. 8 is a flow diagram illustrating an example of the operation of a resource management auction environment architecture according to embodiments of the present invention.

FIG. 8 is a flow diagram illustrating an example of the operation of RMAEA 700. In operation, RMAEA 700 supports the auctioning of goods and services by an entity (e.g., depicted in FIG. 7 as an entity 750) to a bidder (e.g., depicted in FIG. 7 as a bidder 755) via auction system 710. In doing so, entity 750 is able to better manage the auction process and subsequent transactions with bidder 755 through the functionality provided by relationship management system 610 and CRM ASP system 640, as well as their associated modules. As will be appreciated, entity 750 can be, for example, an intermediary (e.g., one of intermediaries 120(1)-(N) of FIG. 1) or a seller (e.g., one of sellers 110(1)-(N) of FIG. 1), or another such entity. Similarly, bidder 755 can be, for example, a bidder such as one of bidders 140(1)-(N) of FIG. 1.

In one scenario, the process begins with entity 750 identifying goods or services to be auctioned, using relationship management system 610 and CRM ASP system 640 (step 800). These items are then listed on by the auction system (step 810). The operation of identifying, selecting and listing an item for auction can be effected, for example, using the drag-and-drop paradigm described earlier in connection with FIG. 4A. The auction system then presents the selected items on a web site supported by the auction system, as being available for bid (step 810). The communications to effect the listing of the items on the auction system's web site can proceed, for example, as follows. Once entity 750 has identified the goods or services inventoried in CRM ASP system 640 that are to be auctioned, entity 750 selects the items to be auctioned from a list presented via relationship management system 610, in the manner described earlier. management 610 and CRM ASP system 640 communicate this information to auction system 710 via auction system connector 715. Auction system connector 715 then calls API 717 to communicate this information to auction platform 720. By these communications, information in or more auction databases 725(1)-(N) is updated.

Entity 750 can now use auction system 710 to review information regarding the items that entity 750 has presented for auction. Next, the items having been listed for auction in auction system 710, bidder 755 is now able to access and view information regarding the items and bid on the items by accessing auction system 710. These communications are effected via internet server API 740, and its access to auction platform 720 via internet server API 740. If bidder 755 so chooses, bidder 755 can then bid on one or more of the items presented for auction by entity 750 via auction system 710. This process repeats for all interested bidders, until bidding phase of the process is complete (step 820). The bidding phase comes to an end, typically, by a predetermined time being reached, a predetermined period of time elapsing or some other comparable criteria. As will be appreciated, other criteria, such as a maximum number of bids without reaching a reserve limit (a minimum acceptable bid), a threshold bid limit being reached, or some other comparable criteria, can easily be employed.

Once the bidding phase of the process has completed (and a winning bid is submitted (e.g., at least one bid is submitted, that meets any reserve that might be set for the item)), entity 750 is notified by auction system 710 via resource management 610 and CRM ASP system 640 of the winning bid. In this example, bidder 755 has submitted the winning bid (step 830). Either under the control of entity 750 or automatically, resource management 610 and CRM ASP system 640 send a request to payment system 650 via payment system connector 655 to retrieve payment from the account of bidder 755 (step 840). As will be appreciated, the payment process can also integrate enterprise resource planning (ERP) functionality, which can further integrate the auction and on-line sales process with one or more of the computerized management of the manufacturing, logistics, distribution, inventory, shipping, invoicing, accounting and other business functions of entity 750.

Auction system 710 notifies bidder 755 of the fact of the winning bid, and the fact of the payment for the item being deducted from the account of bidder 755 in payment system 650 (step 850). Payment system 650 then deducts the requisite funds from the winning bidder's payment account (step 860), and transfers these funds to the account of entity 750, updating CRM ASP system 640 with this information (and so making this information available to entity 750 via relationship management system 610) (step 870). In this process, CRM ASP system 640 makes a call to payment system 650 via payment system connector 655 to perform the actual transaction. Once the transfer of funds is complete, and both entity 750 and bidder 755 have been notified, the transaction is complete.

It will be apparent to one of skill in the art that the processes described in FIG. 8, as well as in other processes and the descriptions of the operation of block diagrams provided herein, can be implemented in software or hardware, and can generally be described by a flow diagram, such as FIG. 2. Thus, it is appreciated that the operations and processes according to embodiments of the present invention discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of such flow diagrams may be executed by a module (e.g., a software module) or a portion of a module or a computer system user using, for example, a computer system such as the storage router previously mentioned, or a similar network element, as well as a computer system such as computer system 210. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, etc. and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:
1. A system comprising:
a customer relationship management system;
a first auction system, wherein
said customer relationship management system is configured to provide a relationship management function to an entity,
said first auction system is configured to allow said entity to offer an item for sale via said first auction system, and
said customer relationship management system is further configured to provide said relationship management function in conjunction with access to said first auction system;
a first auction system connector, wherein
said customer relationship management system and said first auction system are communicatively coupled to one another via said first auction system connector,
said first auction system comprises a first application programming interface specific to said first auction system,
said first auction system connector is configured to communicate with said first application programming interface,
said customer relationship management system comprises a second application programming interface specific to said customer relationship management system,
said first auction system connector is configured to communicate with said second application programming interface, and
said first auction system connector is configured to use said first and said second application programming interfaces to communicatively couple said customer relationship management system and said first auction system;
a second auction system, wherein
said second auction system is configured to allow said entity to offer another item for sale via said second auction system; and a second auction system connector, wherein
  said customer relationship management system and said second auction system are communicatively coupled to one another via said second auction system connector,
  said second auction system comprises a third application program interface specific to said second auction system,
  said second auction system connector is configured to communicate with said second and said third application program interfaces, and
  said second auction system connector is configured to use said third and said second application program interfaces to communicatively couple said customer relationship management system and said second auction system.

2. The system of claim 1, wherein
said customer relationship management system comprises a product management module.

3. The system of claim 1, further comprising:
a customer relationship management application service provider system, wherein
  said customer relationship management system and said customer relationship management application service provider system are configured to communicate with one another.

4. The system of claim 3, wherein
said customer relationship management system comprises a product management module, and
said product management module supports communication with said customer relationship management application service provider system.

5. The system of claim 3, further comprising:
a payment system, wherein
  said customer relationship management system and said customer relationship management application service provider system are communicatively coupled to one another.

6. The system of claim 5, wherein
said customer relationship management system and said customer relationship management application service provider system are communicatively coupled to one another via said customer relationship management application service provider system.

7. The system of claim 6, further comprising:
a payment system connector, wherein
  said customer relationship management system and said customer relationship management application service provider system are communicatively coupled to one another via said payment system connector.

8. The system of claim 1, further comprising:
an on-line storefront system, wherein
  said on-line storefront system and said customer relationship management system are communicatively coupled to one another, and
  said customer relationship management system is further configured to provide said relationship management function in conjunction with access to said on-line storefront system.

9. The system of claim 8, further comprising:
an on-line storefront system connector, wherein
  said customer relationship management system and said on-line storefront system are communicatively coupled to one another via said first auction system connector.

10. The system of claim 1, wherein said first auction system further comprises:
an internet server application programming interface, wherein
  said internet server application programming interface provides a programmatic interface that permits access to said first auction system.

11. The system of claim 10, wherein said first auction system further comprises:
an auction platform, wherein
  said first application programming interface and said internet server application programming interface are communicatively coupled to said auction platform.

12. The system of claim 11, further comprising:
an auction database, wherein
  said auction platform is configured to access said auction database.

13. The system of claim 11, wherein said first auction system further comprises:
a search module; and
a listing module, wherein
  said search module and said listing module are communicatively coupled to said auction platform,
  said first application programming interface provides said first auction system connector with access to said search module and said listing module, and
  said internet server application programming interface provides access to said search module and said listing module.

14. The system of claim 1, further comprising:
creating a changed first auction system connector by changing said first auction system connector, wherein
  said changed first auction system connector is configured to communicate with a changed first application program interface, and
  said changed first auction system connector is configured to use said changed first application program interface and said second application program interface to communicatively couple said customer relationship management system and said first auction system.

15. The system of claim 1, further comprising:
creating a changed first auction system connector by changing said first auction system connector, wherein
  said changed first auction system connector is configured to communicate with a changed second application program interface, and
  said changed first auction system connector is configured to use said first application program interface and said changed second application program interface to communicatively couple said customer relationship management system and said first auction system.

16. The system of claim 1, wherein said item and said another item are the same item.

17. A method comprising:
receiving first information from a first auction system;
receiving second information from a customer relationship management system;
receiving third information from a second auction system;
displaying said first information, said second information, and said third information in a user interface, wherein
  said user interface, said first auction system, said second auction system, and said customer relationship management system are communicatively coupled to one another, said customer relationship management system provides a customer relationship management function to an entity in conjunction with access to said first auction system and access to said second auction system, said first auction system allows said entity to offer an item for sale via said first auction system, and said second auction system allows said entity to offer another item for sale via said second auction system;

automatically transferring said first information from said first auction system to said customer relationship management system via a first auction system connector, wherein said first auction system comprises a first application programming interface specific to said first auction system, said customer relationship management system comprises a second application programming interface specific to said customer relationship management system, said first auction system connector is configured to communicate with said first application programming interface, said first auction system connector is configured to communicate with said second application programming interface, and said first auction system connector is configured to use said first and said second application programming interfaces to communicatively couple said customer relationship management system and said first auction system; and automatically transferring said third information from said second auction system to said customer relationship management system via a second auction system connector, wherein said customer relationship management system and said second auction system are communicatively coupled to one another via said second auction system connector, said second auction system comprises a third application program interface specific to said second auction system, said second auction system connector is configured to communicate with said second and said third application program interfaces, and said second auction system connector is configured to use said third and said second application program interfaces to communicatively couple said customer relationship management system and said second auction system.

18. The method of claim 17, wherein said displaying further comprises:

integrating said first information and said second information.

19. The method of claim 17, further comprising:

transferring said second information from said customer relationship management system to said first auction system, wherein said transferring is performed using said user interface.

20. A computer apparatus comprising:

a computer, wherein said computer comprises a processor;

a memory;

a first auction system, wherein said first auction system is configured to allow an entity to offer an item for sale via said first auction system;

a second auction system, wherein said second auction system is configured to allow an entity to offer another item for sale via said second auction system;

a customer relationship management system, wherein said customer relationship management system comprises means for providing a customer relationship management function to said entity in conjunction with access to said first and second auction system;

means for receiving first information from said first auction system, using said computer, wherein said means for receiving said first information and said first auction system are coupled to one another;

means for receiving second information from said customer relationship management system, using said computer, wherein said means for receiving said second information and said customer relationship management system are coupled to one another;

means for receiving third information from said second auction system, using said computer;

means for integrating said first information, said second information, and said third information, using said computer;

means for displaying said first information, said second information, and said third information in a user interface, using said computer, wherein said means for receiving first information, said means for receiving second information, and said means for receiving third information are coupled to said means for integrating, and said means for integrating is coupled to said means for displaying;

means for accessing said first and second auction systems, using said computer;

a first auction system connector, wherein said customer relationship management system and said first auction system are communicatively coupled to one another via said first auction system connector, said first auction system comprises a first application programming interface specific to said first auction system, said customer relationship management system comprises a second application programming interface specific to said customer relationship management system, said first auction system connector is configured to communicate with said first application programming interface, said first auction system connector is configured to communicate with said second application programming interface, and said first auction system connector is configured to use said first and said second application programming interfaces to communicatively couple said customer relationship management system and said first auction system; and a second auction system connector, wherein said customer relationship management system and said second auction system are communicatively coupled to one another via said second auction system connector, said second auction system comprises a third application program interface specific to said second auction system, said second auction system connector is configured to communicate with said second and said third application program interfaces, and said second auction system connector is configured to use said third and said second application program interfaces to communicatively couple said customer relationship management system and said second auction system.

* * * * *

UNITED STATES PATENT AND TRADEMARK OFFICE
CERTIFICATE OF CORRECTION

PATENT NO.        : 8,442,883 B2
APPLICATION NO.   : 11/171997
DATED             : May 14, 2013
INVENTOR(S)       : Rashid Page 1 of 1

It is certified that error appears in the above-identified patent and that said Letters Patent is hereby corrected as shown below:

In the Specification:

In column 18, line 67, delete "finds" and insert -- funds --, therefor.

In column 19, line 39, delete "finds" and insert -- funds --, therefor.

In column 19, line 59, delete "650" and insert -- 650. --, therefor.

In column 25, line 61, delete "volatile" and insert -- Volatile --, therefor.

Signed and Sealed this
Seventeenth Day of September, 2013

Teresa Stanek Rea
*Deputy Director of the United States Patent and Trademark Office*